US006766509B1

(12) United States Patent
Sheretov et al.

(10) Patent No.: US 6,766,509 B1
(45) Date of Patent: *Jul. 20, 2004

(54) METHODOLOGY FOR TESTING SPREADSHEET GRIDS

(75) Inventors: Andrei Ernstovich Sheretov, Corvallis, OR (US); Margaret Myers Burnett, Corvallis, OR (US); Gregg Evan Rothermel, Albany, OR (US)

(73) Assignee: Oregon State University, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,771

(22) Filed: Dec. 27, 1999

Related U.S. Application Data

(63) Continuation-in-part of application No. 09/438,084, filed on Nov. 10, 1999.
(60) Provisional application No. 60/153,098, filed on Sep. 9, 1999, and provisional application No. 60/125,414, filed on Mar. 22, 1999.

(51) Int. Cl.[7] .................................................. G06F 9/44
(52) U.S. Cl. .......................... 717/125; 717/123; 717/128
(58) Field of Search ................................. 717/123–124, 717/125–133; 715/503–504, 506

(56) References Cited

U.S. PATENT DOCUMENTS 6,496,832 B2 * 12/2002 Chi et al. .................... 707/102

OTHER PUBLICATIONS

M. Burnett and H. Gottfried, "Graphical Definitions: Expanding Spreadsheet Languages through Direct Manipulation and Gestures," *ACM Trans. Computer–Human Interaction* 5(1), 1–33, Mar. 1998.(Burnett98).

E. Chi, J. Riedl, P. Barry, and J. Konstan, "Principles for Information Visualization Spreadsheets," *IEEE Computer Graphics and Applications*, Jul./Aug. 1998.(Chi98).
C. Cook, K. Rothermel, M. Burnett, T. Adams, G. Rothermel, A. Sheretov, F. Cort, J. Reichwein. Does immediate visual feedback about testing aid debugging in spreadsheet language? TR 99–60–07, Oregon State University, Mar. 1999. (Cook99).

(List continued on next page.)

*Primary Examiner*—Tuan Dam
*Assistant Examiner*—Ted T. Vo
(74) *Attorney, Agent, or Firm*—Marger Johnson & McCollom, P.C.

(57) ABSTRACT

The invention includes two methods for testing a spreadsheet region. Du-associations are collected for the spreadsheet region. In the Straightforward approach, du-associations are collected for each cell in the region. Each cell's execution trace is tracked. After the user validates a cell, the du-associations for the cell that participated in the execution trace are marked as executed. In the Region Representative approach, a region representative represents the region. Each cell's execution trace is tracked. After the user validates a cell, the du-associations for the region representative that participated in the execution trace for the validated cell are marked as executed. Du-associations for other cells that are affected by the testing of a spreadsheet region are similarly marked as covered. If the user changes a shared non-constant formula, the collected du-associations for the region are discarded and the steps of collecting test elements and tracking execution traces are repeated. Cells that depend on the changed cell also partially discard and collect anew test elements and repeat the tracking step. The invention also includes a method for providing a user with feedback of the testedness of the spreadsheet region. The du-associations for each region are maintained, and the subset of du-associations that have been covered is identified. Using the numbers of tested and untested du-associations, a testedness measure is calculated for the cell, which is provided to the user.

40 Claims, 14 Drawing Sheets

OTHER PUBLICATIONS

R. Djang and M. Burnett, "Similarity Inheritance: A New Model of Inheritance for Spreadsheet VPLs," *1998 IEEE Symp. Visual Languages*, Halifax, Canada, 134–141, Sep. 1–4, 1998. (Djang98).

P. Frankl and E. Weyuker, "An Applicable Family of Data Flow Criteria," *IEEE Trans. Software Engineering* 14(10), 1483–1498, Oct. 1988 (Frankl88).

D. Hamlet, B. Gifford, and B. Nikolik, "Exploring Dataflow Testing of Arrays," *Int. Conf. Software Engineering*, 118–129, May 1993. (Hamlet93).

J. Horgan and S. London, "Data Flow Coverages and the C Language," *Proc. Fourth Symp. Testing, Analysis, and Verficiation*, 87–97, Oct. 1991. (Horgan91).

J. Leopold and A. Ambler, "Keyboardless Visual Programming Using Voice, Handwriting, and Gestures," *1997 IEEE Symp. Visual Languages*, Capri, Italy, 28–35, Sep. 23–26, 1997. (Leopold97).

B. Myers, "Graphical Techniques in a Spreadsheet for Specifying User Interfaces," *ACM Conf. Human Factors in Computing Systems*, New Orleans, LA, 243–249, Apr. 28–May 2, 1991. (Myers91).

B. Nardi and J. Miller, "Twinkling Lights and Nested Loops: Distributed Problems Solving and Spreadsheet Development," *Int. Journal of Man–Machine Studies* 34, 161–194, 1991. (Nardi91).

R. Panko and R. Halverson, "Spreadsheets on Trial: A Survey of Research on Spreadhseet Risks," *Hawaii Int. Conf. System Sciences*, Maui, Hawaii, Jan. 2–5, 1996.(Panko96).

G. Rothermel, L. Li, C. DuPuis, and M. Burnett, "What You See Is What You Test: A Methodology for Testing Form-Based Visual Programs," *Int. Conf. Software Engineering*, 198–207, Apr. 1998. (Rothermel98).

T. Smedley, P. Cox, and S. Byrne, "Expanding the Utility of Spreadsheets Through the Integration of Visual Programming and User Interface Objects," *ACM Proc. Workshop on Advanced Visual Interfaces*, Gubbio, Italy, 148–155, May 27–29, 1996. (Smedley96).

G. Wang and A. Ambler, "Solving Display–Based Problems," *1996 IEEE Symp. Visual Languages*, Boulder, Colorado, 122–129, Sep. 3–6, 1996. (Wang96).

E. Weyuker, "The Cost of Data Flow Testing: An Empirical Study," *IEEE Trans. Software Engineering* 16(2), Feb. 1990. (Weyuker90).

E. Wilcox, J. Atwood, M. Burnett, J. Cadiz, and C. Cook, "Does Continuous Visual Feedback Aid Debugging in Direct–Manipulation Programming Systems?" *ACM Conf. Human Factors in Computing Systems*, 258–265, Mar. 22–27, 1997. (Wilcox97).

N. Wilde and C. Lewis, "Spreadsheet–Based Interactive Graphics: From Prototype to Tool," *ACM Conf. Human Factors in Computing Systems*, 153–159, Apr. 1990. (Wilde90).

K. Rothermel, M. Burnett, C. Cook, G. Rothermel, A. Sheretov, T. Adams, F. Cort, and J. Reichwein, "An Empirical Evaluation of a WYSIWYT Testing Methodology for Spreadsheets," *Oregon State University Dept. of Computer Science Technical Report*, 1–13, Mar. 1999.

H. Agrawal and J. Horgan, "Dynamic Program Slicing," *ACM SIGPLAN '90 Conference on Programming Language Design and Implementation*, 246–255, Jun. 20–22, 1990.

J.W. Atwood, Jr., M.M. Burnett, R.A. Walpole, E.M. Wilcox, and S. Yang, "Steering Programs Via Time Travel," *IEEE Symposium on Visual Languages*, 4–11, Sep. 3–6, 1996.

T. Bell and S. Eick, "Visualization Program Slices," *IEEE*, 288–295, 1994.

P. Brown and J. Gould, "An Experimental Study of People Creating Spreadsheets," *ACM Transactions on Office Information Systems*, 258–272, vol. 5, No. 3, Jul. 1987.

M. Burnett, J. Atwood, Jr., and Z. Welch, "Implementing Level 4 Liveness in Declarative Visual Programming Languages," *Proceedings 1998 IEEE Symposium on Visual Languages*, 126–133, Sep. 1–4, 1998.

M. Burnett and H. Gottfried, "Graphical Definitions: Expanding Spreadsheet Languages Through Direct Manipulation and Gestures," *ACM Transactions on Computer–Human Interaction*, 1–33, vol. 5, No. 1, Mar. 1998.

M. Burnett, R. Hossli, T. Pulliam, B. VanVoorst, and X. Yang, "Toward Visual Programming Languages for Steering Scientific Computations," *IEEE Computational Science & Engineering*, 44–62, 1994.

T.Y. Chen and Y.Y. Cheung, "On Program Dicing," *Software Maintenance: Research and Practice*, 33–46, 1997.

C. Cook, M. Burnett, and D. Boom,"A Bug's Eye View of Immediate Visual Feedback in Direct–Manipulation Programming Systems," *Oregon State University Dept. of Computer Science*, 20–41, 1995.

S. Davis, "Tools for Spreadsheet Auditing," *Human Computer Studies*, 429–442, 1996.

D.G. Hendry and T.R.G. Green, "Creating, Comprehending and Explaining Spreadsheets: a Cognitive Interpretation of what Discretionary Users Think of the Spreadsheet Model," *Journal of Human–Computer Studies*, 1033–1065, 1994.

S. Horwitz, T. Reps, and D. Binkley, "Interprocedural Slicing Using Dependence Graphs," *ACM Transactions on Programming Languages and Systems*, 26–60, vol. 12, No. 1, Jan. 1990.

B. Korel and J. Rilling, "Dynamic Program Slicing Methods," *Information and Software Technology*, 647–659, 1998.

J.W. Laski and B. Korel, "A Data Flow Oriented Program Testing Strategy," *IEEE Transactions on Software Engineering*, 347–354, vol. SE–9, No. 3, May 1983.

H. Lieberman and C. Fry, "Zstep 95: A Reversible, Animated Source Code Stepper," *Software Visualization Programming as a Multimedia Experience*, 277–292, 1995.

J. Lyle and M. Weiser, "Automatic Program Bug Location by Program Slicing," *The Second International Conference on Computers and Applications*, 877–883, Jun. 23–27, 1987.

S. Ntafos, "On Required Element Testing," *IEEE Transactions on Software Engineering*, 795–803, vol. SE–10, No. 6, Nov. 1984.

K. Ottenstein and L. Ottenstein, "The Program Dependence Graph in a Software Development Environment," *ACM Software Engineering Notes SIGPLAN Notices*, 177–184, May 1984.

S. Rapps adn E. Weyuker, "Selecting Software Test Data Using Data Flow Information," *IEEE Transactions on Software Engineering*, 367–375, vol. SE–11, No. 4, Apr. 1985.

T. Reps, S. Horwitz, M. Sagiv, and G. Rosay, "Speeding up Slicing," *ACM SIGSOFT '94*, 11–20, Dec. 1994.

B. Ronen, M. Palley, and H. Lucas, Jr., "Spreadsheet Anaysis and Design," *Communications of the ACM*, 84–93, vol. 32, No. 1, Jan. 1989.

G. Rothermel, M.J. Harrold, "Analyzing Regression Test Selection Techniques," *IEEE Transactions on Software Engineering*, 529–551, vol. 22, No. 8, Aug. 1996.

S. Sinha, M.J. Harrold, and G. Rothermel, "System–Dependence–Graph–Based Slicing of Programs with Arbitrary Interprocedural Control Flow," *Proceedings of the 1999 International Conference on Software Engineering*, 432–441, May 16–22, 1999.

G. Viehstaedt and A. Ambler, "Visual Representation and Manipulation of Matrices," *Journal of Visual Languages and Computing*, 273–298, 1992.

F. Tip, "A Survey of Program Slicing Techniques," *Journal of Programming Languages*, 121–189, vol. 3, No. 3, Sep. 1995.

M. Weiser, "Program Slicing," *IEEE Transactions on Software Engineering*, 352–357, vol. SE–10, No. 4, Jul. 1984.

* cited by examiner

METHODOLOGY FOR TESTING SPREADSHEET GRIDS

RELATED APPLICATION DATA

This application is a continuation-in-part of co-pending, commonly assigned U.S. patent application Ser. No. 09/438,084 entitled "A METHODOLOGY FOR TESTING SPREADSHEETS", filed Nov. 10, 1999, and incorporated by reference herein. This application also claims priority from U.S. Provisional Application No. 60/153,098, filed Sep. 9, 1999, and from U.S. Provisional Application No. 60/125,414, filed Mar. 22, 1999.

This invention was made with the U.S. Government support under Grant Numbers CCR-9457473, CCR-9703108 and EIA-9806821, awarded by the National Science Foundation (NSF). The U.S. Government has certain rights in the invention.

BACKGROUND OF THE INVENTION

Testing is an important activity, used widely by professional and end-user programmers alike in locating errors in their programs. In recognition of its importance and widespread use, there has been extensive research into effective testing in traditional programming languages in the imperative paradigm. However, there are few reports in the literature on testing in other paradigms, and no known reports on testing in spreadsheet languages other than that presented in U.S. patent application Ser. No. 09/438,084, entitled "METHODOLOGY FOR TESTING SPREADSHEETS", filed Nov. 10, 1999. The spreadsheet paradigm includes not only commercial spreadsheet languages, but also a number of research languages that extend the paradigm with explicitly visual features, such as support for gestural formula specification (Burnett98, Leopold97), graphical types (Burnett98, Wilde90), visual matrix manipulation (Wang96), high-quality visualizations of complex data (Chi98), and specifying GUIs (Myers91). In this specification, the term spreadsheet languages describes all such systems following the spreadsheet paradigm.

Despite the perceived simplicity of spreadsheet languages, and even though spreadsheet creators devote considerable effort to finding and correcting their errors (Nardi91), errors often remain. In fact, a recent survey of spreadsheet studies (Panko96) reports spreadsheet error rates ranging from 38% to 77% in controlled experiments, and from 10.7% to 90% in "production" spreadsheets—those actually in use for day-to-day decision making. A possible factor in this problem is the unwarranted confidence creators of spreadsheets seem to have in the reliability of their spreadsheets (Wilcox97).

To help solve this problem, applicant's Ser. No. 60/125,414 (Rothernel98) presents a testing methodology for spreadsheets at the cell level. The methodology provides feedback as to "testedness" of cells in simple spreadsheets in a manner that is incremental, responsive, and entirely visual. However, scalability issues were not addressed in that previous work. Accordingly, a need remains to scale up the approach to support large grids of cells with shared or copied formulas.

SUMMARY OF THE INVENTION

One aspect of the invention is two methods for testing a spreadsheet region. In one method, referred to as the Straightforward approach, test elements are collected for each spreadsheet cell in the region. Each cell's execution trace is tracked and, when a group of cells is validated, the subset of test elements that participated in the execution trace for each cell is marked as covered.

In the other method, referred to as the Region Representative approach, test elements are collected for a region representative, which represents all cells in the region. In the preferred embodiment, the test elements are du-associations. Each cell's execution trace is tracked and, when a cell is validated, the subset of test elements in the region representative that participated in the execution trace for that cell is marked as covered.

Another aspect of the invention is a method for providing a user with feedback of the testedness of the spreadsheet cells in the region. The set of test elements for the region is maintained, and the subset of the set of test elements that have been covered is identified. Using the sizes of the set of test elements and the subset of the set, a testedness measure is calculated for each cell in the region, which is provided to the user.

DETAILED DESCRIPTION OF THE PREFERRED EMBODIMENT

I. Background: Testing Individual Cells

Section I presents the relevant material from U.S. patent application Ser. No. 09/438,084, entitled "METHODOLOGY FOR TESTING SPREADSHEETS", filed Nov. 10, 1999, based on Ser. No. 60/125,414, filed Mar. 22, 1999 and incorporated herein by reference for this application.

There is an underlying assumption that, as the user develops a spreadsheet incrementally, he or she is also testing incrementally. A prototype implementation for incremental, visual testing in the spreadsheet VPL Forms/3 exists (Burnett98), and the examples in this specification are presented in that language. In the prototype, every cell in the spreadsheet is considered to be untested when it is first created, except "input cells" (cells whose formulas may contain constants and operators, but no cell references and no if-then expressions), which are considered trivially tested. For the non-input cells, testedness is reflected via border colors on a continuum from untested (red) to tested (blue).

Figure 9:
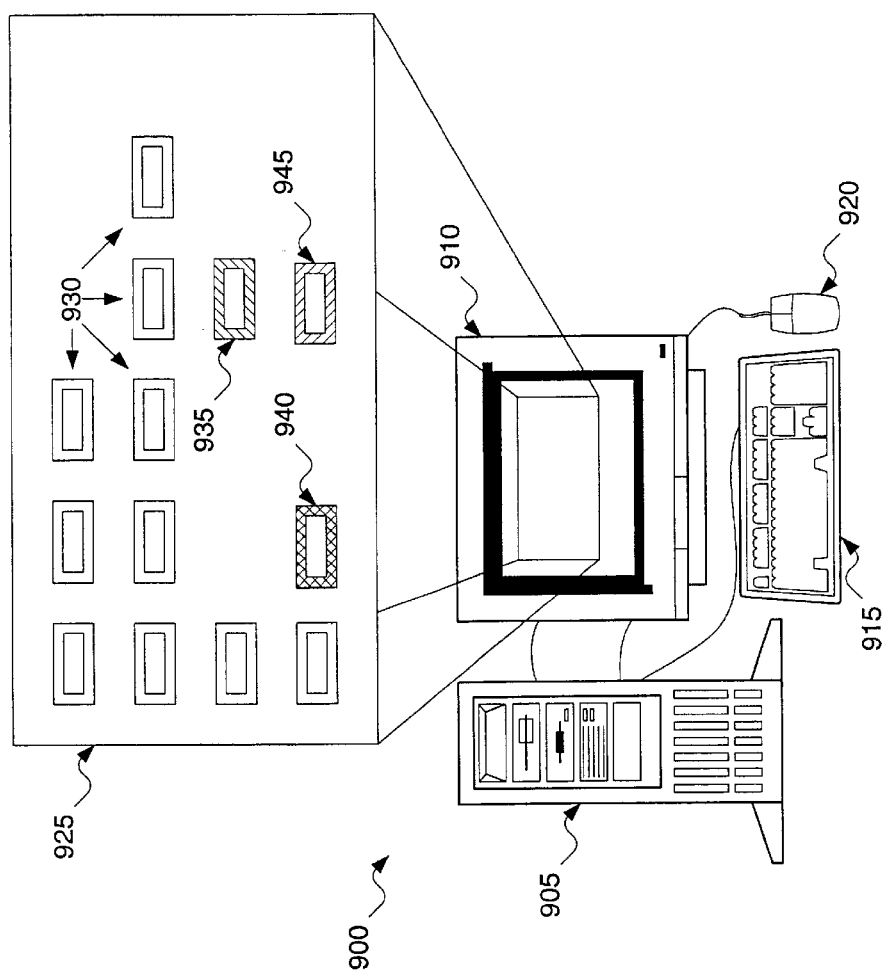
FIG. 9 shows an example spreadsheet on a computer display.

FIG. 9 shows a typical computer system 900 that can be used for testing spreadsheet cells using the preferred embodiment. Computer system 900 includes a computer 905 (including, among other components, a CPU and memory (not shown)), a monitor 910, a keyboard 915, and a pointer or mouse 920. Optional equipment not shown can include a printer, plotter, light pen, and so forth. Computer system 900 can also be connected to a network. Displayed on monitor 910 is a spreadsheet 925. Spreadsheet 925 includes several cells 930, 935, and 940. Cells 935 and 940 in particular show cells in various stages of testedness. In the preferred embodiment monitor 910 displays cells 935 and 940 using colors; however, grayscale and fill patterns can also be used to indicate measures of testedness, and will be used in this application for simplicity.

Figure 1:
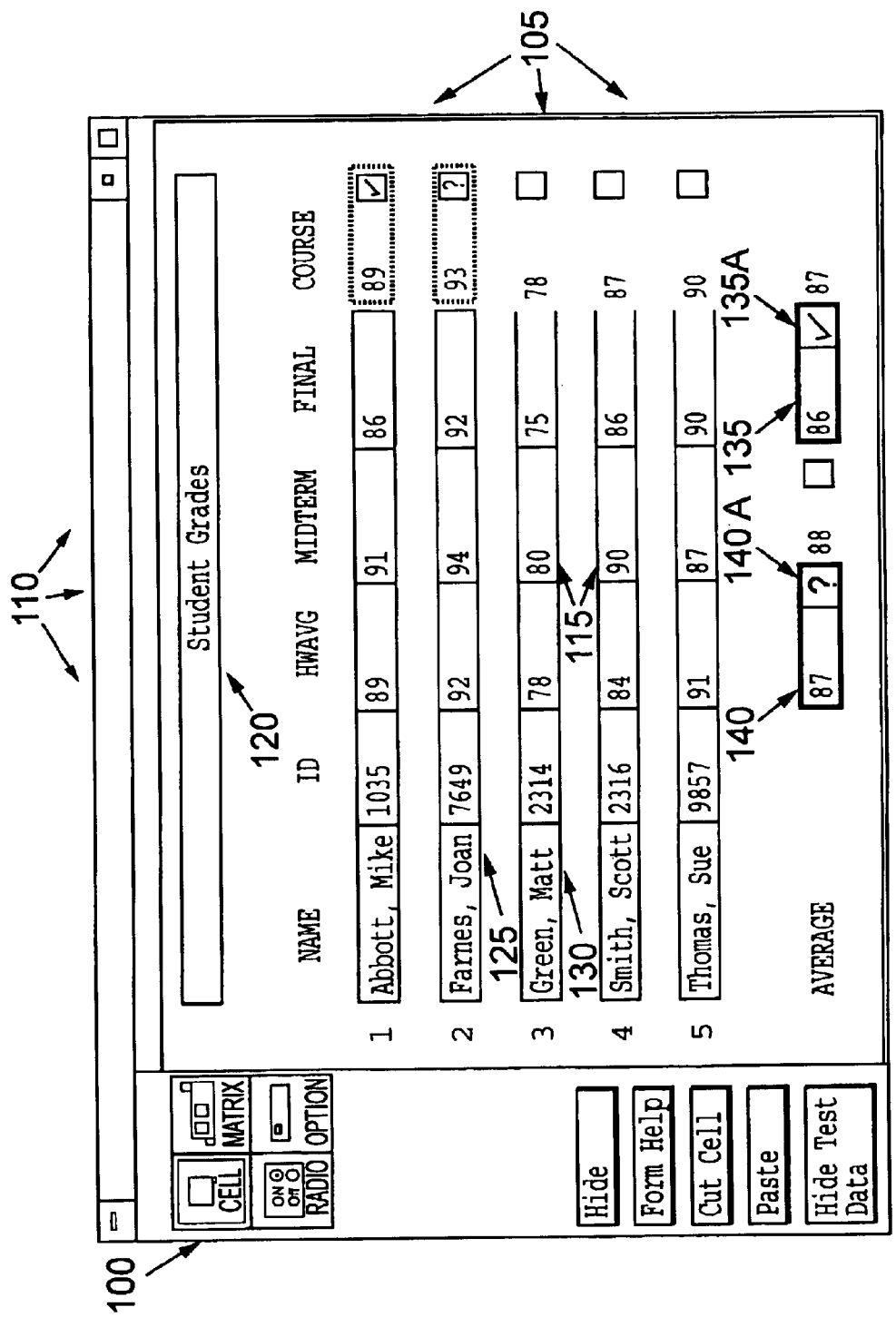
FIG. 1 shows a sample spreadsheet.

FIG. 1 shows a typical spreadsheet 100. A typical spreadsheet 100 is composed of a number of rows 105 and a number of columns 110. Each cell 115 lies at the intersection of a row and a column. As shown with cell 120, a cell can span multiple columns; not shown, but equally possible, are cells that span multiple rows or span both rows and columns. Each cell 115 can contain different data: for example, cell 125 stores the name "Farnes, Joan" and cell 130 stores the name "Green, Matt."

The testing process is as follows. During the user's spreadsheet development, whenever the user notices a correct value in a cell 135, he or she lets the system know of this test (decision) by validating the correct cell (clicking in the checkbox 135A in its right corner), which causes a checkmark to appear. This communication allows the system to track successful tests, to propagate the implications of the successful test to cells that contributed to it, and to reflect this increase in "testedness" by coloring borders of the checked cell and its contributing cells more "tested" (more blue). On the other hand, whenever the user notices an incorrect value, rather than checking it off, he or she eventually finds the faulty formula and fixes it. This formula edit means that affected cells will now have to be re-tested; the system is aware of which ones those are, and re-colors their borders more "untested" (red).

The system also keeps the user apprised of cells that may no longer be considered validated. Cell 140 was once validated, but the validation has been brought into question, e.g., by changing a formula upon which cell 140 depends. Changing the checkmark in the validation tab 140A for cell 140 to a question mark shows this uncertainty.

But, what is "testedness" and what does it mean to be fully tested? Most spreadsheets can have an infinite number of inputs; hence, all possible inputs cannot be tested. Test adequacy criteria are criteria used to decide whether a program has been tested "enough." U.S. Patent Application entitled "METHODOLOGY FOR TESTING SPREAD-SHEETS" develops an abstract model for simple spreadsheets and uses it to define several test adequacy criteria. ("Simple spreadsheets" means those with a collection of cells with conventional expression-based formulas. The model does not address "power" features such as macros, cyclical dependencies, or recursion.) The strongest criterion, du-adequacy, is the criterion used in this specification to define when a spreadsheet has been tested "enough." However, a person skilled in the art will recognize that other testing criteria can readily be substituted for du-adequacy. The present invention extends the model and du-adequacy as they relate to spreadsheet grids below. The border colors described above are a mapping from n, a percent tested according to the du-adequacy criterion, to the color at $n+K_n\%$ past the start of a red-blue continuum, where each $K_n$ adjusts to ensure that 100% tested is considerably more blue than 99% tested, and that 0% tested is considerably more red than 1% tested.

Thus, if the user manages to turn all the red borders blue, the test adequacy criterion has been satisfied. Empirical work on simple spreadsheet cells shows that measurements of users' testing effectiveness and efficiency were significantly higher for subjects using Forms/3 supplemented by this scheme than for those using Forms/3 without the testing supplement (Cook99).

II. Problems Raised by Large Grids

The basic methodology for testing spreadsheets described above works at the granularity of individual cells. However, most large grids in spreadsheets are fairly homogeneous: i.e., include many cells whose formulas are identical except for some of the row/column indices. For example, suppose the spreadsheet in FIG. 1 were expanded to calculate student grades for a class containing 300 students. There are two problems with the basic testing methodology for this kind of grid:

Problem 1: For the user, each of the 300 course grade cells would have to be explicitly validated for the spreadsheet to appear completely tested (blue). The user is unlikely to go to this much trouble for essentially-identical cells, which would mean the user would be burdened with keeping track of which cells "really" need testing and which ones do not because of their similarities to other cells.

Problem 2: For the system, the performance of the testing subsystem depended on the number of cells. Hence, responsiveness was impaired by the presence of large grids.

For both the user and the system, these burdens seem inappropriate, given that the Grades spreadsheet's logic with 300 students is exactly the same as in the same Grades spreadsheet with only 5 students. In order to solve these problems, the basic methodology needed to be extended to explicitly support homogeneous grids.

III. Attributes of Grids

A. Homogeneity

A grid is a two-dimensional matrix of cells. Most commercial spreadsheet languages are entirely grid-based. The grids of particular interest to us are largely homogeneous—i.e., many of their cells have identical formulas except perhaps for row/column indices. Thus, in this specification, the term grid implies some homogeneity, and a region means a subgrid in which every cell has the same formula, except perhaps for row/column indices.

A spreadsheet language needs knowledge of the homogeneity of a grid region's formulas as a necessary first step in taking advantage of the approach described in this specification, but this knowledge is easily obtained. It is already present in those spreadsheet languages in which the user is allowed to share explicitly a single formula among several cells (e.g., Lotus® (Lotus is a registered trademark of Lotus Development Corporation), Forms/3 (Burnett98), Formulate (Wang96), Prograph spreadsheets (Smedley96), and Chi et al.'s visualization spreadsheet language (Chi98)). If not already present, knowledge of homogeneity can easily be gathered "behind the scenes" by a spreadsheet language, such as by maintaining knowledge of the relationships among copied formulas as in (Djang98).

B. Static Versus Dynamic

There are two attributes of grids and regions that are static in some spreadsheet languages and dynamic in others, and these attributes significantly impact the manner in which "testedness" of grid cells can be tracked. The first is whether a grid's size (number of rows and columns) is specified statically or dynamically. Static specification of grid size is the norm for commercial spreadsheet languages, but some research systems use dynamic size specifications (e.g., Forms/3 and Formulate).

The second of these two attributes is whether determination is static or dynamic as to exactly which cells are being referenced in a formula. The most common approach in commercial spreadsheet languages is static, restricting cell row/column references to be based only on static position, optionally offset by a constant.

Traditional imperative languages—for which most research in testing has occurred—typically support statically-sized, dynamically-referenced grids via arrays. Approaches for reasoning about the testedness of array elements have been suggested (Frankl88, Hamlet93, Horgan91). In general, however, the problem of precisely treating array references at the element level is unsolvable for the dynamic referencing that is the norm in imperative programs. Thus, the prevalence of static referencing in the spreadsheet paradigm affords unusual opportunities for reasoning about testedness.

In summary, for viable application to commercial spreadsheet languages, a testing methodology must at least support statically-sized, statically-referenced grids. The two approaches described in this specification do support this type of grid, and also support the dynamically-sized, statically-referenced grid type.

C. Grids in Forms/3

Figure 2A:
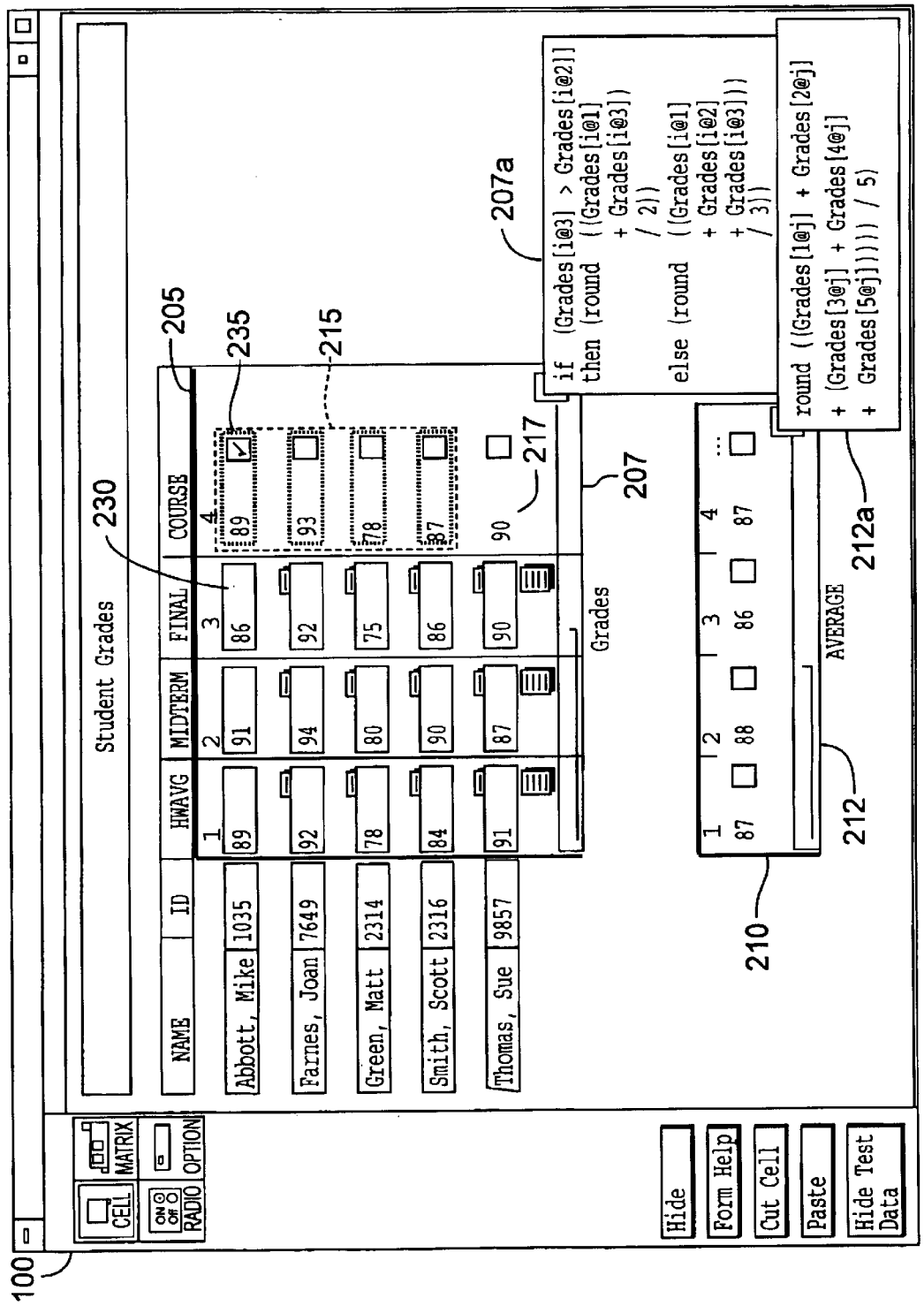
FIG. 2A shows the spreadsheet of FIG. 1 prepared using grids.

The invention was prototyped using a grid called a matrix in Forms/3. To define values for a Forms/3 grid's (matrix's) cells, the user statically partitions the grid into rectangular regions and, for each region, enters a single formula for all cells in it. Thus, a region is a rectangular sub-matrix of cells having a shared formula. To statically derive a cell's formula from its shared region formula, any "pseudo-constants" i and j in the formula are replaced by the cell's actual row and column number. Each grid has two additional cells, its row dimension cell and column dimension cell, to specify its number of rows and columns. These cells can have arbitrarily complex formulas. FIG. 2A shows a spreadsheet similar to that in FIG. 1 rewritten with the use of grids. The row and column dimension formulas not shown are simply constants in this example. Course grade grid 205 includes five rows and four columns. Except for the last column, the regions in grid 205 consist of one cell each, because the cells' formulas are different constant values. However, the entire fourth column is a region 207, which uses one shared formula 207A to describe the calculated grade for each student in the course. Average grade grid 210 consists of one region 212, which uses one shared formula 212A to describe how the average grade for each assignment can be calculated using a shared formula. Average grade grid 210 includes one row and four columns. However, a person skilled in the art will recognize that a grid can be composed of any number of rows and columns.

IV. Testing Grids

A. The Cell Relation Graph Model

The U.S. Patent Application entitled "METHODOLOGY FOR TESTING SPREADSHEETS" defined an abstract model called a cell relation graph (CRG) to reason about testedness, and the approaches described here for testing grids are based upon this model. A CRG is a pair (V, E), where V is a set of formula graphs, and E is a set of directed edges called cell dependence edges connecting pairs of elements in V. Each element of V represents the formula for a cell, and each edge in E depicts dataflow between a pair of cells. A formula graph models flow of control within a cell's formula, and is comparable to a control flow graph representing a procedure in an imperative program. There is one formula graph for each cell in the spreadsheet.

Figure 2B:
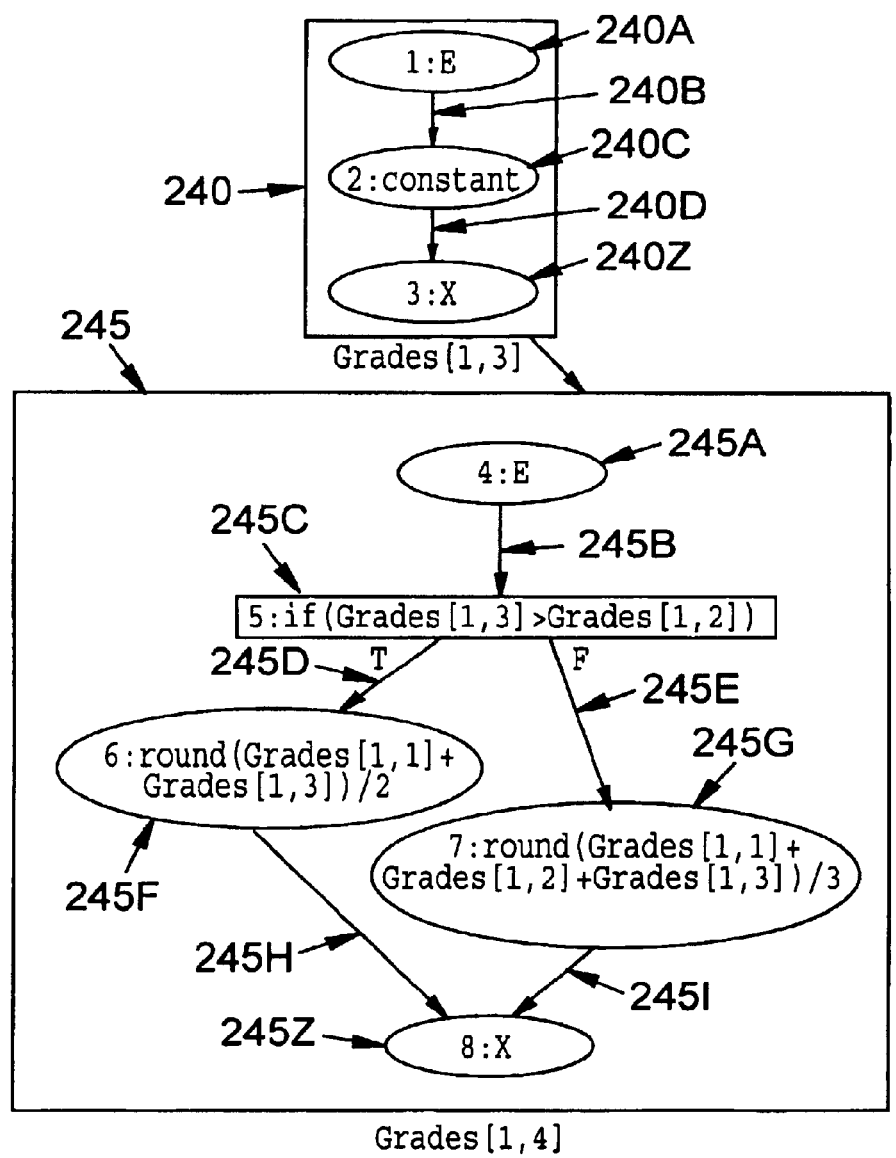
FIG. 2B shows a portion of the cell relation graph of FIG. 2A.

For example, FIG. 2B shows a portion of the CRG for FIG. 2A. Specifically, FIG. 2B shows the CRGs for Mike Abbott's final grade 230 and course grade 235. Each formula graph 240, 245 is delimited by a dotted rectangle. In the formula graphs, nodes labeled E 240A, 245A and X 240Z, 245Z are entry and exit nodes respectively, and represent initiation and termination of the evaluation of formulas. Rectangular nodes, such as node 245C, are predicate nodes. Other nodes, such as nodes 240C, 245F, and 245G, are computation nodes. Edges, such as 240B, 240D, 245B, 245D, 245E, 245H, and 245I, within formula graphs represent flow of control between expressions, and edge labels indicate the value to which conditional expressions must evaluate for particular paths to be taken.

Using the CRG model, du-adequacy is the criterion used in this specification to define when a spreadsheet has been tested "enough." Under this criterion, a cell X will be said to have been tested enough when all of its definition-use associations (abbreviated du-associations) have been covered (executed or exercised) by at least one test. In this model, a test is a user decision as to whether a particular cell contains the correct value, given the input cells' values upon which the value cell depends. Thus, given a formula graph for a cell X that references cell Y, du-adequacy is achieved with respect to the interactions between cell X and cell Y when each of cell X's uses (references to cell Y) of each definition in cell Y (node directly connected to the exit node in cell Y's formula graph) has been covered by a test. (A reference in a computation node is one use. A reference in a predicate node is two uses: one for the predicate's then-edge and one for its else-edge. This explanation of "use" is informal; formal definitions are given in (Rothermel98).)

For example, the du-associations involving Abbott's Final cell (Grades(1, 3)) and his Course cell (Grades(1, 4)) are (2, 5)T, (2, 5)F, (2, 6), and (2, 7), using the node numbers in FIG. 2B. Hence, under the du-adequacy criterion, Grades(1, 4) is tested enough when there has been a successful test in which Grades(1, 3) was greater than Grades(1, 2)—covering du-associations (2, 5)T and (2, 6)—and another test in which Grades(1, 3) was not greater than Grades(1, 2)—covering du-associations (2, 5)F and (2, 7). (This discussion simplifies the situation by ignoring the uses of Abbott's Midterm and HwAvg, since their formula graphs are not included in FIG. 2).

B. A Straightforward Approach

One method for explicitly supporting grid testing is to let the user validate all or part of an entire spreadsheet in one operation, but to have the system maintain testedness information about each cell individually. This approach is called the "Straightforward" approach. For the Straightforward approach, the CRG model does not need to be modified, although extensions to the way the CRG model is used are required. The Straightforward approach is also a useful baseline for comparison for the second, more effective, method, the Region Representative approach.

Because all information is kept individually for each cell, the user has the flexibility to validate arty arbitrary group of cells, or even any cell individually. Nevertheless, in general, the user will validate a group of cells that share a formula. For example, the user has chosen to rubber-band 215 most of the Course column of FIG. 2A and validate the cells in rubber-band 215 in one click, since all of those cells use the "else" part of the formula, but to attend individually to the bottom cell 217, which uses the "then" part. (As is well known in the art, rubber-banding is a technique for selecting multiple items to process at once. In FIG. 2A, the user has rubber-banded a group of spreadsheet cells.) This approach does not address Problem 2, but it provides a highly flexible solution to Problem 1. Note that only one cell in the Course column of FIG. 2A has been explicitly validated by the user: that is the specific cell for which the user-clicked the validation tab. But because of rubber-band 215, the du-associations for each cell in rubber-band 215 are also validated automatically by the system.

The Straightforward approach is implemented as follows. Like other spreadsheet languages, the system can retrieve or update any cell efficiently, accomplished via a hash table in the preferred embodiment. For each cell C (whether or not C is a grid cell), the system collects and stores the following information, either statically or dynamically.

C.DirectProducers, the cells that C references (static).

C.Defs, the (local) definitions in C's formula (static).

C.Uses, the (local) uses in C's formula (static).

C.DUA, a set of pairs (du-association, covered) for each du-association (static, dynamic).

C.ValTab, C's validation status (dynamic).

C.Trace, trace of C's formula graph nodes executed in the most recent evaluation of C (dynamic).

It is reasonable to rely upon the formula parser and the evaluation engine to provide the first three of these items, because they are already needed to efficiently update the screen and the saved values after each formula edit.

To support the testing of grids, the system needs to perform four tasks: (1) whenever the user edits a formula for C's region, static du-associations are collected in C.DUA (Tables 1–2); (2) whenever C is executed, the most recent execution trace of nodes is stored in C.Trace (via a probe in the evaluation engine); (3) whenever the user validates C by clicking on C or another cell rubber-banded with C, C.Trace is used to mark some of the pairs in C.DUA covered (Table 3); and (4) whenever the user edits some non-input formula for a producer of C, affected du-associations in C.DUA need to be marked "not covered" (via an algorithm similar to CollectAssocSF). (A simple variant on Task 4 is triggered by editing an input formula, which does not change testedness information, although it does change validation checkmarks of affected cells to question marks. This variant is not covered in detail in this specification, since it is simply a matter of omitting most of the work of the Task 4 algorithms.) For example, the result of gathering du-associations for cell Grades(1, 4) (the Course Grade for Mike Abbot) in FIGS. 2A and 2B would be as given above; the result of tracing its execution would be {5, 7}; the result of validating it would be that du-associations (2, 5)F and (2, 7), as well as some involving Grades(1, 1) and Grades(1, 2), would be marked "covered"; and the result of editing it would be that any "covered" marks in its consumer, Average (1, 4), would be removed.

Table 1 refers to StaticallyResolve. StaticallyResolve is an O(1) routine that returns the actual cell to which a reference with relative indices resolves. Relative indices are expressed using i to mean "this row" and j to mean "this column." For example, if M(1, 3) refers to P(i,j−1), StaticallyResolve (M(1, 3), P(i,j−1)) returns P(1, 2). Hence, only du-associations involving the actual grid cells to which C refers are gathered by the system. This desirable property is due to the static referencing-common in spreadsheet languages. Given static referencing, StaticallyResolve works even in the case of dynamically-sized grids, because in that combination each region size except one must be static.

Figure 3A:
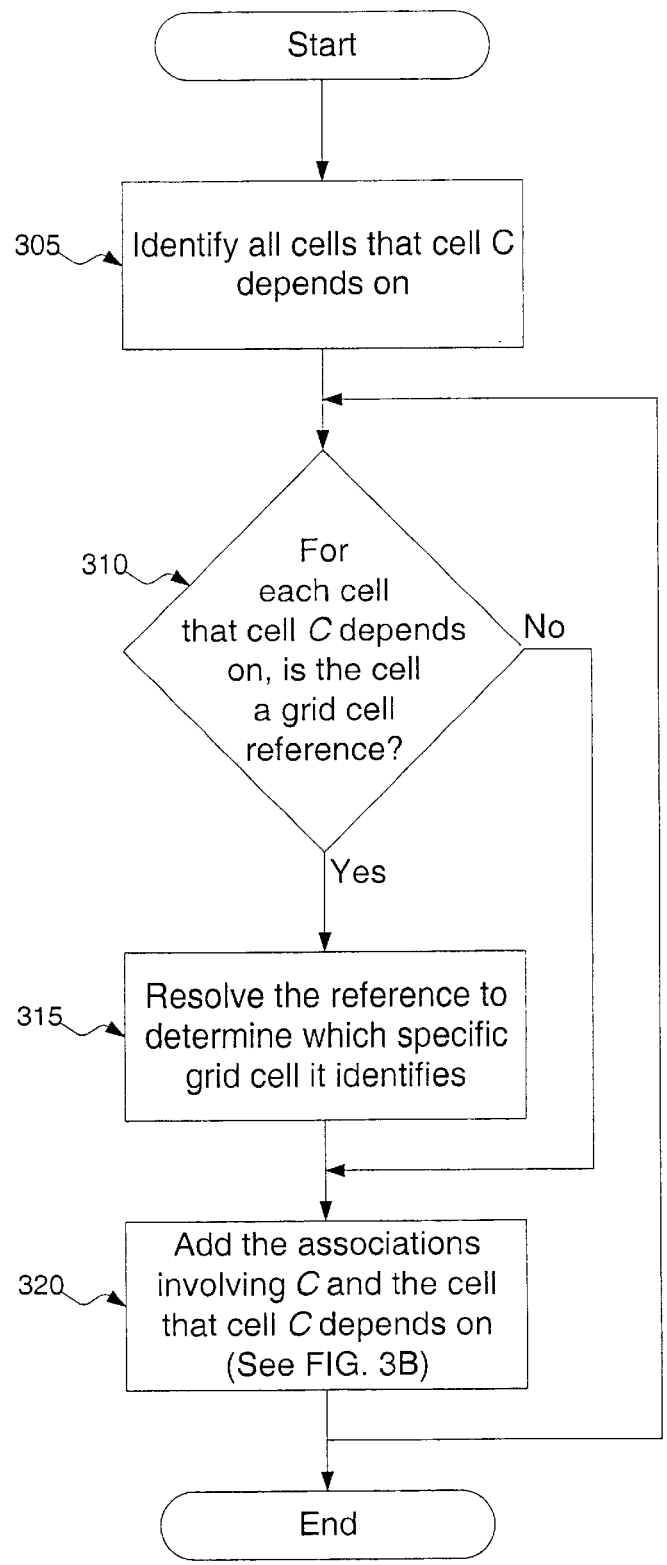
FIGS. 3A and 3B show a flowchart of the method for collecting du-associations for a using the Straightforward approach.
Figure 3B:
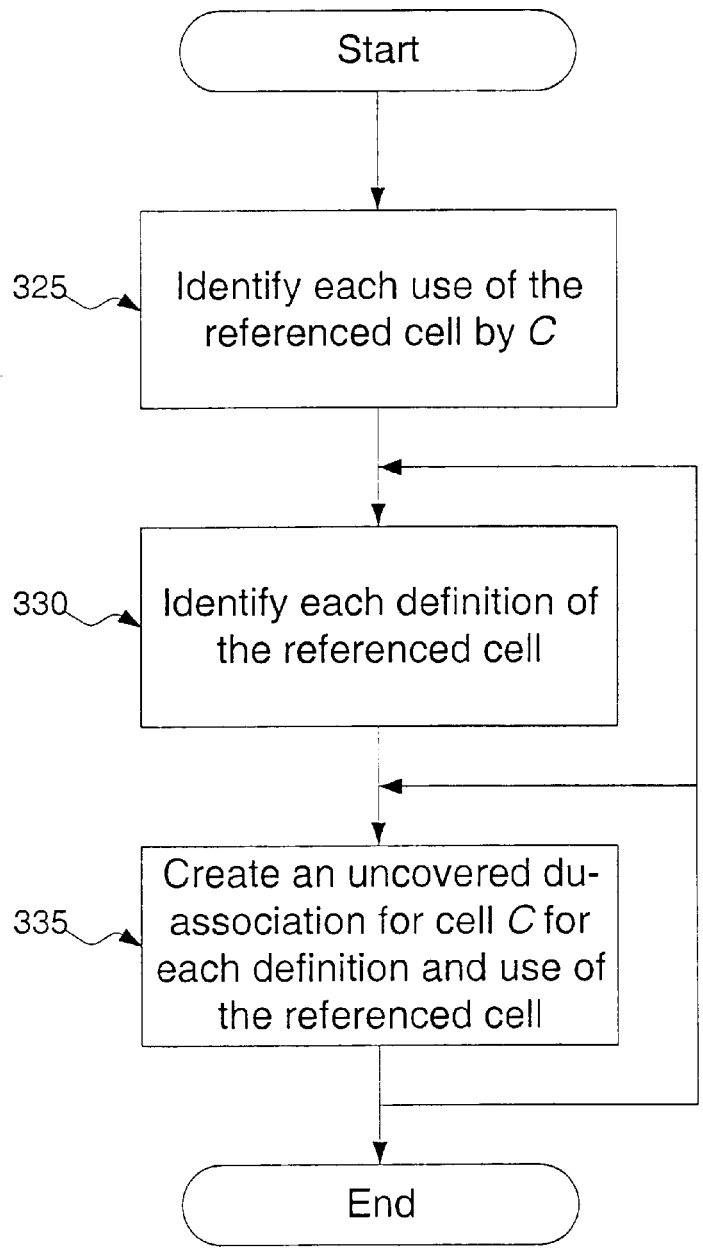

Tables 1–2 and FIGS. 3A–3B show the method for collecting du-associations for a cell using the Straightforward approach. Referring to Table 1 and FIG. 3A, the process for collecting the du-associations for a cell C is as follows. First, at line 2 (step 305), it is established that the cells that cell C depends on will be considered. Then, at line 3 (step 310), each such cell is checked to see if the cell is a grid cell reference. If it is, then at line 4 (step 315), the grid cell reference is resolved to determine to which specific cell in the grid it refers. Finally, at line 5 (step 320), the du-associations involving uses by C of definitions of the result of line 4 are added to C's collection of du-associations.

Referring to Table 2 and FIG. 3B, at line 2 (step 325), each use of the referenced cell is determined. Then, at line 3 (step 330), each definition of the referenced cell is determined. Finally, at line 4 (step 335), a du-association is created for each definition and use of the referenced cell.

TABLE 1

| 1. | algorithm CollectAssocSF(C) |
| 2. | for each cell D ∈ C.DirectProducers do |
| 3. | if D is a grid cell reference then |
| 4. | D = StaticallyResolve(C, D) |
| 5. | AddAssoc(C, D) |

TABLE 2

| 1. | algorithm AddAssoc(C, D) |
| 2. | for each use u (of D) ∈ C.Uses do |
| 3. | for each definition d (of D) ∈ D.Defs do |
| 4. | C.DUA = C.DUA ∪ { ((d, u), false) } |

The difference between Table 1 and an optimized version of the original algorithm for simple cells (the U.S. Patent Application entitled "METHODOLOGY FOR TESTING SPREADSHEETS") lies in lines 3–4.

Figure 4:
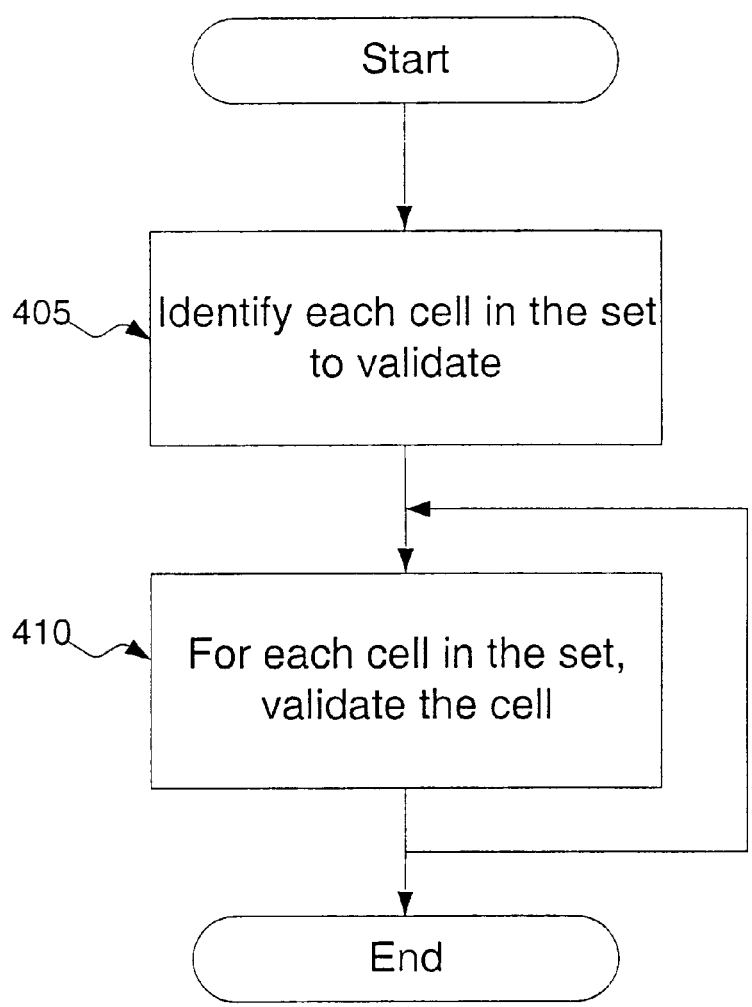
FIG. 4 shows a flowchart of the method for validating a region.

Table 3 and FIG. 4 show the method for validating a set of cells. First, at line 2 (step 405), each cell to be validated is identified. Then, at line 3 (step 410), each cell is individually validated. The procedure ValidateCoverage is described in the U.S. Patent Application entitled "METHODOLOGY FOR TESTING SPREADSHEETS", and will not be repeated here.

TABLE 3

| 1. | algorithm ValidateSelectedCells(setOfSelectedCells) |
| 2. | for each cell C ∈ setOfSelectedCells do |
| 3. | ValidateCoverage(C) |

The worst-case time costs of the Straightforward approach for tasks 1, 3, and 4 approach, not surprisingly, at least n * the cost of testing an individual cell, where n is the number of cells in the region. This dependency on region size can be a significant detriment to responsiveness for large grids. However, the approach does provide the expressive power to allow the user to easily and flexibly validate all or part of an entire region in a single operation.

V. Region Representative Approach

The "Region Representative" approach is a preferred solution to the deficiencies of the Straightforward approach.

It aims directly at the problem of system efficiency by working at least partially at the granularity of entire regions rather than at the granularity of individual cells in those regions. This is accomplished by sharing most of the testedness data structure described above among all cells in a region. This sharing improves system efficiency over the Straightforward approach and provides many conveniences to the user, some of which are even greater than in the Straightforward approach, but it does not provide quite as much flexibility.

A. What the User Does

The visual devices are the same as in the Straightforward approach (see FIG. 2A), but the implications of the user's actions are different: the user's validation of one grid cell X now propagates—to every cell in its region—the du-associations covered by executing cell X. For example, if no cells in FIG. 2A were validated yet and then the user validated the top Course cell, which executes the predicate and the else-expression in the formula, all of the Course column's cells would be shown in purple (partially tested). If the user subsequently validated the bottom Course cell, which executes the then-expression, the entire column's borders would become blue (fully tested).

The Region Representative approach offers several problem-solving advantages over the Straightforward approach from the user's perspective. These advantages stem from the fact that the user does less test generation manually: a large grid already provides a variety of input data. The first advantage, obviously, is that the user may not need to conjure up new test inputs. For example, in the Grades spreadsheet, the user tested the top Course cell in part by selecting another cell for validation—the bottom Course cell—because it had a useful set of test inputs already contributing to it. In contrast to this, in the Straightforward approach the user could only achieve coverage on the top Course cell by forcing execution of both branches in that particular cell. This leads to a mechanical advantage as well: the Region Representative approach requires fewer physical actions, i.e., edits and validation clicks, to achieve full coverage. The third advantage is that, when the user does not provide a new test input, he or she does not need to modify the "real" input data and then remember to restore it. Fourth, the user's job as "oracle" (decider of the correctness of values) may be a little easier with the Region Representative approach, because with so many inputs from which to choose, it may be possible to notice one that produces obvious answers, such as a row with identical inputs in the first 3 columns in the Grades example.

An apparent disadvantage is loss of flexibility: the user seems to have no way to prevent the propagation of testedness to all the cells in the region. Hence, some functionality is lost. For example, the user of the Region Representative approach as described above cannot exclude a cell from group tests in favor of individualized testing, such as a cell that refers to an out-of-range value.

However, most instances of this disadvantage are removed, because the user is allowed to subdivide a region into more than one region for testing purposes. For example, suppose there is a region R in which each cell is computed by adding one to the cell above it. The user might want to test the top row of a rectangular region separately because it is based on an initial set of values (those provided by a different region above it) rather than upon cells in the same region. To do this, the user simply subdivides R into two regions, $R_1$ and $R_2$, and tests them separately.

B. Implications for the CRG Model

Figure 5A:
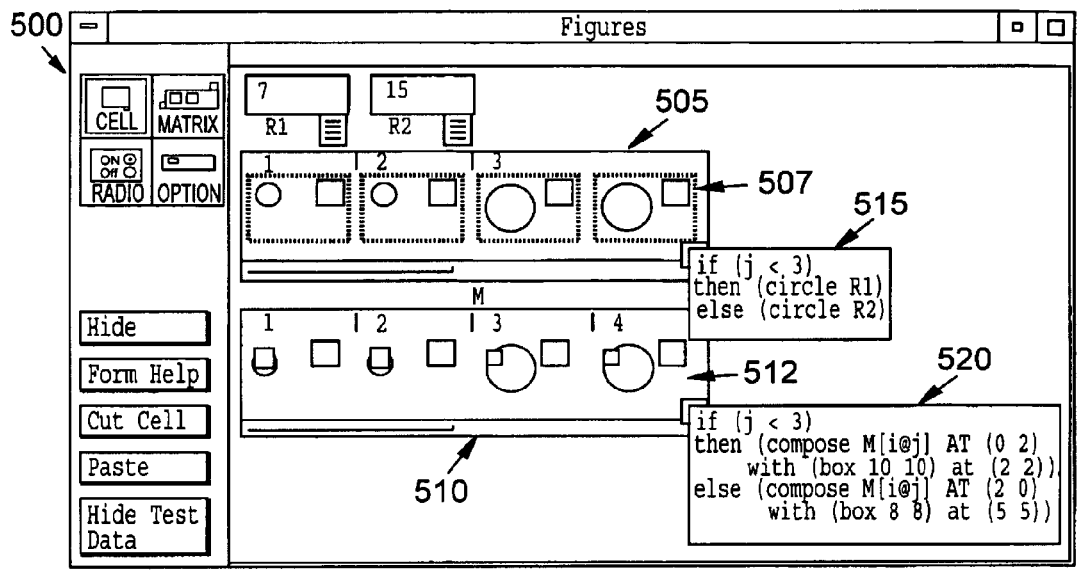
FIG. 5A shows a spreadsheet utilizing the Region Representative approach.
Figure 5B:
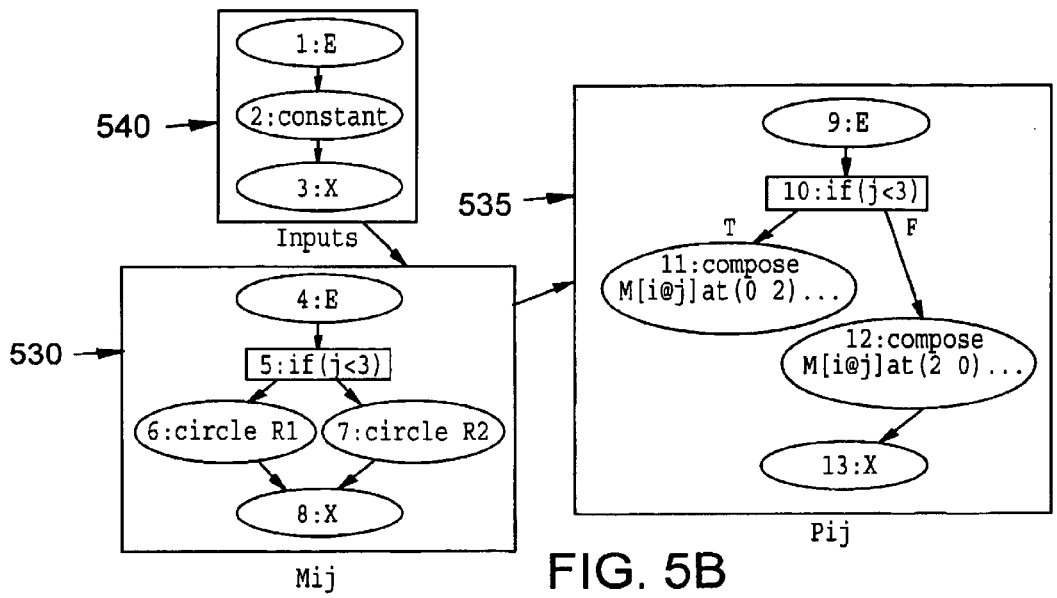
FIG. 5B shows a portion of the cell relation graph of FIG. 5A.

The Region Representative approach requires changes to the CRG model. Instead of a formula graph for each cell in a region R, R's cells are modeled by a single formula graph of a region representative Rij in that region, as shown in FIGS. 5A and 5B. In FIG. 5A, spreadsheet 500 includes two grids: grid M 505 and grid P 510. Each grid in FIG. 5A consists of only one region: grid M 505 contains region 507, and grid P 510 contains region 512. Region 507 has shared formula 515, and region 512 has shared formula 520. Contrasting FIG. 5B with FIG. 2B shows the difference in the CRG model. In FIG. 2B, formula graph 245 is an example formula graph for one cell in the rightmost region of grid 205. But in FIG 5B, formula graphs Mij 530 and Pij 535 represent regions 507 and 512, respectively. Further, a special region 540 includes all input cells. This special region collapses all input values into one shared definition without losing the "use" circumstances. Hence, uses in the CRG can now contain both "ordinary" cell references (for cells not in a region) and/or references to region representatives to represent references to all cells inside the region.

C. Algorithms

The Region Representative approach is implemented as follows. Five data structures corresponding to those described in the Straightforward approach are now stored for each region representative instead of for each cell: Rij.DirectProducers, Rij.Defs, Rij. Uses, Rij.DUA, and Rij.ValTab. Only one data structure is still stored for each cell: C.Trace.

Given these data structures, the algorithm for collecting Rij.DUA (Task 1) is shown in Tables 4–5. Recall that the Straightforward approach collected 4 du-associations involving Abbott's Course and Final cells. Hence for the 5-student region, 20 du-associations would be collected, and for a 300-student region, 1200 du-associations would be collected. In contrast to this, CollectAssocRR produces only 4 du-associations to represent interactions between Course and Final cells for all students, whether the region size is 5 or 300.

Figure 6:
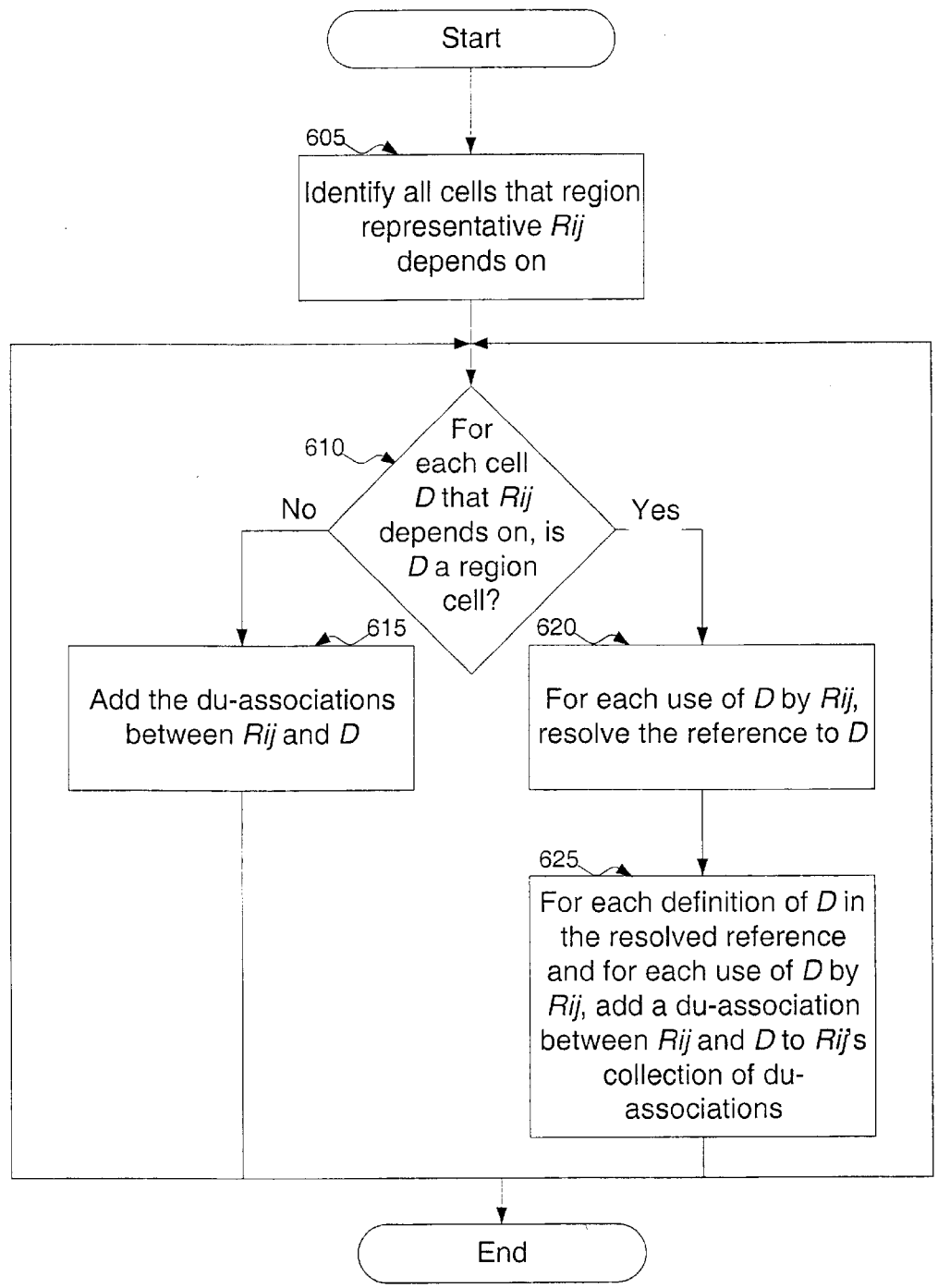
FIG. 6 shows a flowchart of the method for collecting du-associations for a cell using the Region Representative approach.

Table 4 and FIG. 6 show the algorithm for collecting du-associations for cells using the Region Representative approach. The external difference from CollectAssocSF is that this routine is called once per region rather than once per cell. The internal difference (lines 4–7) is that if region representative Rij refers to grid M's cell D, then the representative of every region in M to which D could possibly belong must be included as a use of Rij. In line 2 (step 605), the cells that are producers for the region representative are identified. In lines 3–4 (step 610), each such producer cell is examined to determine if it is an ordinary cell reference or a region cell. If it is an ordinary cell reference (line 3), then at step 615 du-associations are added to the region representative's collection. On the other hand, if the identified cell is a region cell (line 4), then for each use of the identified cell (line 5), the identified cell is resolved (line 6 and step 620). Finally, at lines 7–9 (step 625), the du-associations involving definitions of the results of line 6 used by Rij are added to Rij's collection of du-associations.

TABLE 4

1. algorithm CollectAssocRR(Rij)
2.   for each cell D ∈ Rij.DirectProducers do
3.     if D is an ordinary cell then AddAssoc(Rij, D)
4.     if D is a region cell then
5.       for each use u (of D) ∈ Rij.Uses do
6.         regReps = StaticallyResolveRegion(Rij, D)
7.         for each defRij ∈ regReps do
8.           for each definition d ∈ defRij.Defs do
9.             Rij.DUA = Rij.DUA ∪ { ((d, u), false) }

Table 5 presents the same algorithm in terms of CRG and cell formula graph (CFG) nodes. The logic and efficiencies of the two versions are the same. Line 2 of Table 4 corresponds to line b of Table 5, line 3 corresponds to line d, line 4 corresponds to line h, line corresponds to line c, and lines 6–9 correspond to lines i–l. (Note that useNode.Uses is a set, so no cellID (use) can occur more than once. In the prototype, each use is stored with a count of the number of occurrences in the actual formula.)

TABLE 5

| | |
|---|---|
| a. | algorithm CollectAssocRR(Rij) |
| b. | for each node UseNode ∈ Rij.CFGNodes do |
| c. | for each use u ∈ useNode.Uses do |
| d. | if u.Reference is an ordinary cell reference then |
| e. | C = GetCell(u.Reference) |
| f. | for each node defNode ∈ C.Defs do |
| g. | DUConnect(defNode, useNode, u) |
| h. | if u.Reference is an region cell reference then |
| i. | regReps = StaticallyResolveRegion(Rij, u.Reference) |
| j. | for each defRij ∈ regReps do |
| k. | for each node defNode ∈ defRij.Defs do |
| l. | DUConnect(defNode, useNode, u) |

CollectAssocRR uses StaticallyResolveRegion, which is essentially StaticallyResolve changed to the granularity of regions. Given a region R and its representative Rij whose formula includes the reference P(i,j), StaticallyResolveRegion returns a list of representatives for regions to which P(i,j) could belong, at a cost of O(r) where r is the number of regions in P. Similarly to StaticallyResolve, Rij provides the context. For example, if Rij, a representative of a region covering row 1 from columns 2 to 4, refers to P(i,j−1), where P is a grid with regions at the same positions, then StaticallyResolveRegion (Rij, P(i,j−1)) returns two representatives: one for the region of P containing only row 1 column 1, and one for the region of P containing row 1 columns 2 to 4.

Regions that are collections of separated rectangles can also be supported by the approach. A motivation for separated rectangles in a region arises if the user desires just a few exceptions to the homogeneity in a region. For example, regarding the Grades spreadsheet of FIG. 2A, suppose Green has a medical emergency and misses the Midterm exam, and that the instructor chooses to calculate Green's course grade using a special formula that omits the Midterm. Geometrically, this would divide the Grades Course column (region) into 3 rectangular regions—one for every student above Green, one for Green's course grade, and one for every student below Green. But logically, 2 regions would be more appropriate because only 2 distinct formulas are needed—one for Green's course grade, and one for the two rectangles that contain all the other students' course grades. Supporting a region that can consist of multiple disjoint rectangles would allow this. The additional logic would be localized within StaticallyResolveRegion, changing its complexity from O(r) to O(rect), where rect is the total number of separated rectangles in the r regions of the rid. This is not really an increase over the total time cost that would be present without support for separated rectangles, because in that case there would be more regions. For example, in the Green scenario, without support for separated rectangles in a region, 3 regions would be present, i.e., r=3; with support for separated rectangles in a region, a total of 3 rectangles (in 2 regions) would be present, i.e., rect=3. Thus, for simplicity, multiple-rectangle regions can be ignored in discussions of cost, since the cost works out to be the same as if the same number of strictly rectangular regions as there are contiguous rectangles were used.

Figure 7A:
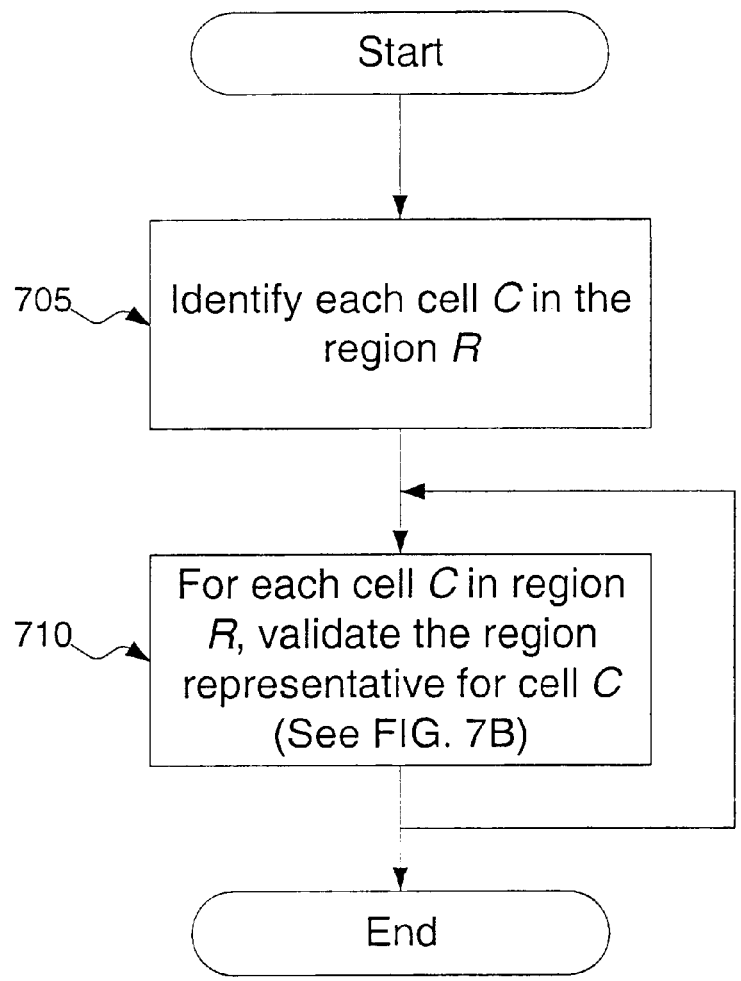
FIGS. 7A, 7B, and 7C show a flowchart of the method for validating cells using the Region Representative approach.
Figure 7B:
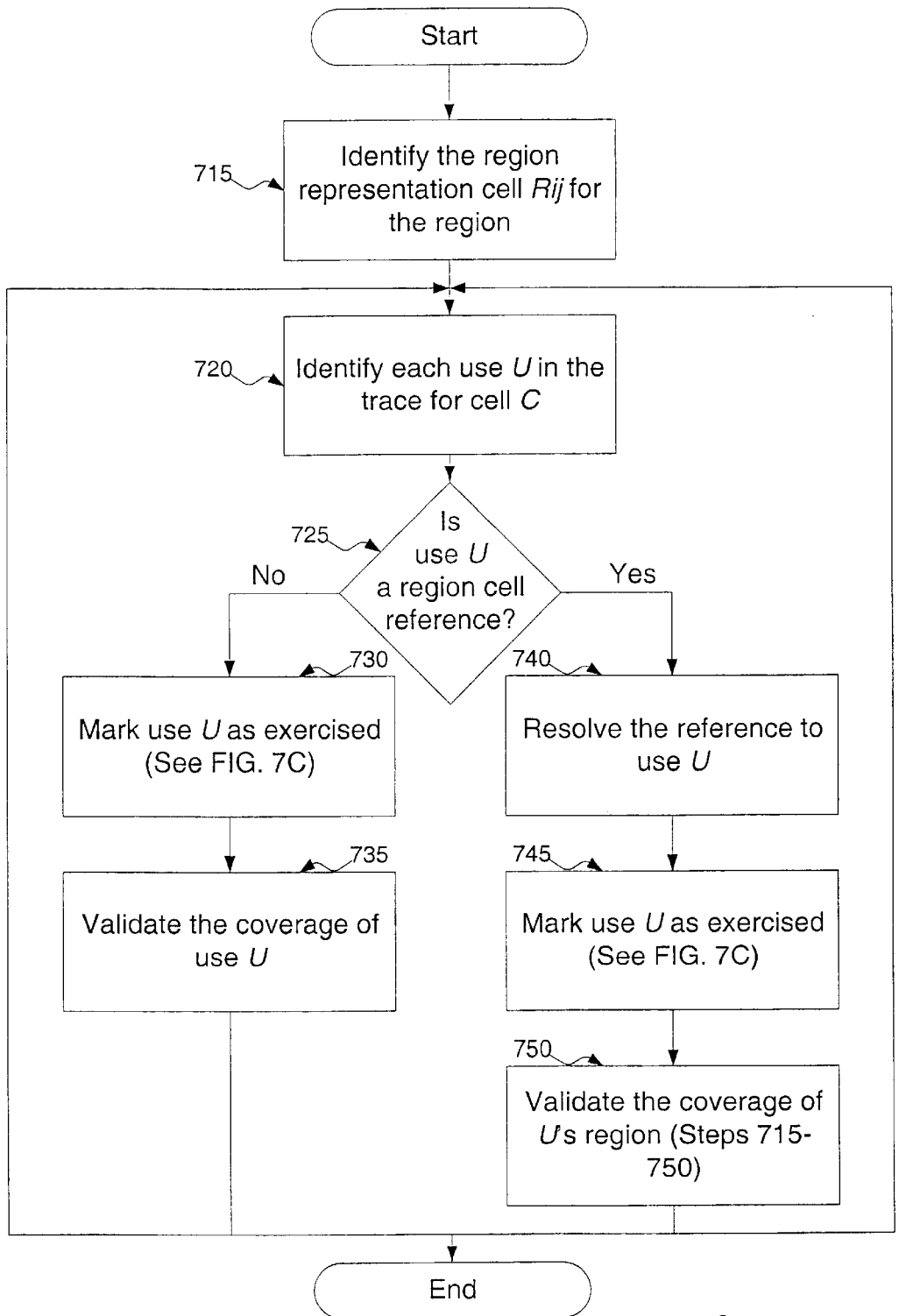
Figure 7C:
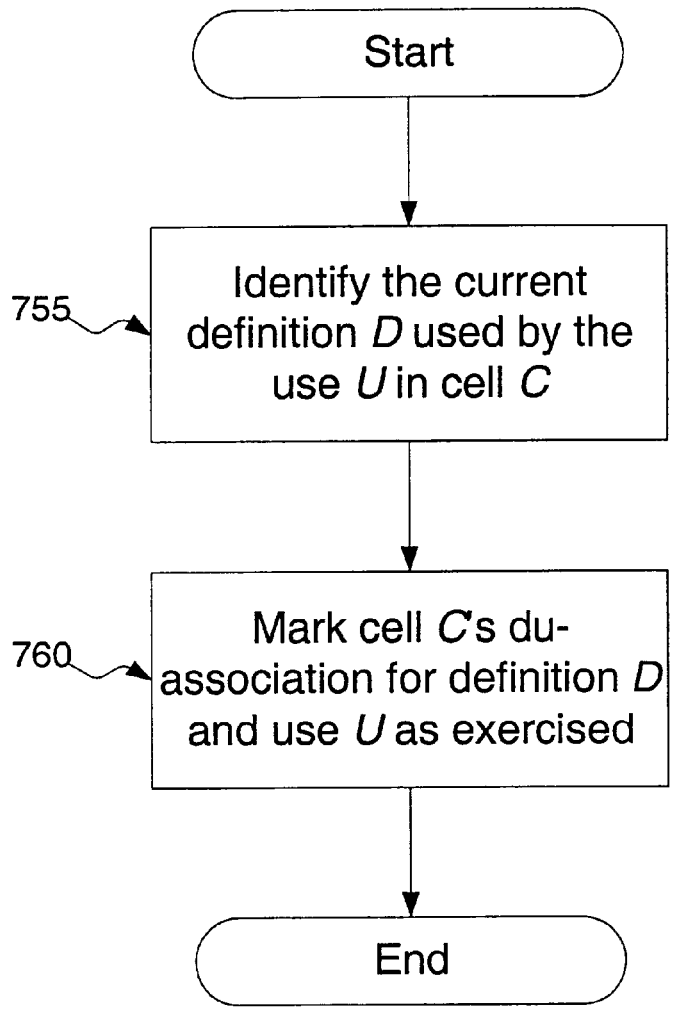

Storing execution traces (Task 2) is implemented simply by inserting a probe into the evaluation engine, so no separate algorithm is shown here. The algorithm for region validation (Task 3) is shown in Tables 6–8. (A mechanism to prevent duplicated recursive calls, the ValidatectID field, is discussed in Table 3 and FIG. 8 of the U.S. Patent Application "METHODOLOGY FOR TESTING SPREADSHEETS" and has been omitted here for brevity.) FIGS. 7A, 7B, and 7C show the flowcharts for the method for validating cells under the Region Representative approach. Referring to Table 6 and FIG. 7A, at line 2 (step 705), each cell in the region is identified. Then, at line 3 (step 710), for each cell in the region, the region representative for that cell is validated.

TABLE 6

| | |
|---|---|
| 1. | algorithm ValidateRegionRR(R) |
| 2. | for each cell C ∈ R do |
| 3. | ValidateRepRR(R, C) |

Table 7 and FIG. 7B show the method for validating the region representative for a cell in the region. At line 2 (step 715), the region representative is identified. Then, at line 3 (step 720), each use in the current trace for the cell is identified. At lines 4 and 7 (step 725), the use is examined to determine if it is an ordinary or region cell reference. If the use is an ordinary cell reference, then at line 5 the use is marked as covered (step 735) and at line 6 the referenced cell is validated (step 735). On the other hand, if the use is a region cell reference, then at line 8 (step 740), the reference is resolved. At line 9 (step 745) the use is marked as covered. Finally, at lines 10–11 (step 750), the resolved referenced cell's region representative is itself validated recursively.

TABLE 7

| | |
|---|---|
| 1. | algorithm ValidateRepRR(R, C) |
| 2. | Rij = R's region representative |
| 3. | for each use u ∈ C.Trace do |
| 4. | if u is an ordinary cell reference then |
| 5. | MarkCovered(Rij, u) |
| 6. | ValidateCoverage(u) |
| 7. | if u is an region cell reference then |
| 8. | u = StaticallyResolve(C, u) |
| 9. | MarkCovered(Rij, u) |
| 10. | uRegion = u's region |
| 11. | ValidateRepRR(uRegion, u) |

Table 8 and FIG. 7C shout the method for marking a use as covered. At line 2 (step 755), the current definition used by the use is identified. Then, at line 3 (step 760), the du-association consisting of the identified definition and the use is marked as covered.

TABLE 8

| | |
|---|---|
| 1. | algorithm MarkCovered(C, u) |
| 2. | d = the current definition of u in u.Trace |
| 3. | C.DUA = C.DUA ∪ { ((d, u), true) } - { ((d, u), false) } |

Tables 9–10 show the same algorithms expressed in terms of CRG and CFG nodes. Line 3 of Table 7 corresponds to lines b–c of Table 9, line 4 corresponds to line f of Table 10, line 5 of Table 7 and all of Table 8 correspond to lines h–i, line 6 of Table 7 corresponds to line j, line 7 corresponds to line k, line 8 corresponds to line 1, line 9 of Table 7 and all of Table 8 correspond to lines m–n, and lines 10–11 of Table 7 correspond to line o. (Note that all updates to C's data structure also update its region representative's data structure, since cells in a region share the same data structure for all testedness information except traces.)

TABLE 9 a. algorithm.ValidateRR(C)
b. for each node useNode ∈ C.Trace do
c.    for each association dua ∈ useNode.IncomingDUA do
d.      ValidateAssocRR(dua, C)

TABLE 10 e. algorithm ValidateAssocRR(dua, C)
f. if dua.use.Reference is an ordinary cell reference then
g.   C = GetCell(dua.use.Reference)
h.   if dua.defNode ∈ C.Trace then
i.     dua.validated = true
j.     ValidateRR(C)
k. if dua.use.Reference is an region cell reference then
l.   defcell = StaticallyResolve(C, dua.use.Reference)
m.   if dua.DefNode ∈ defCell.Trace then
n.     dua.validated = true
o.     ValidateRR(defCell)

Figure 8:
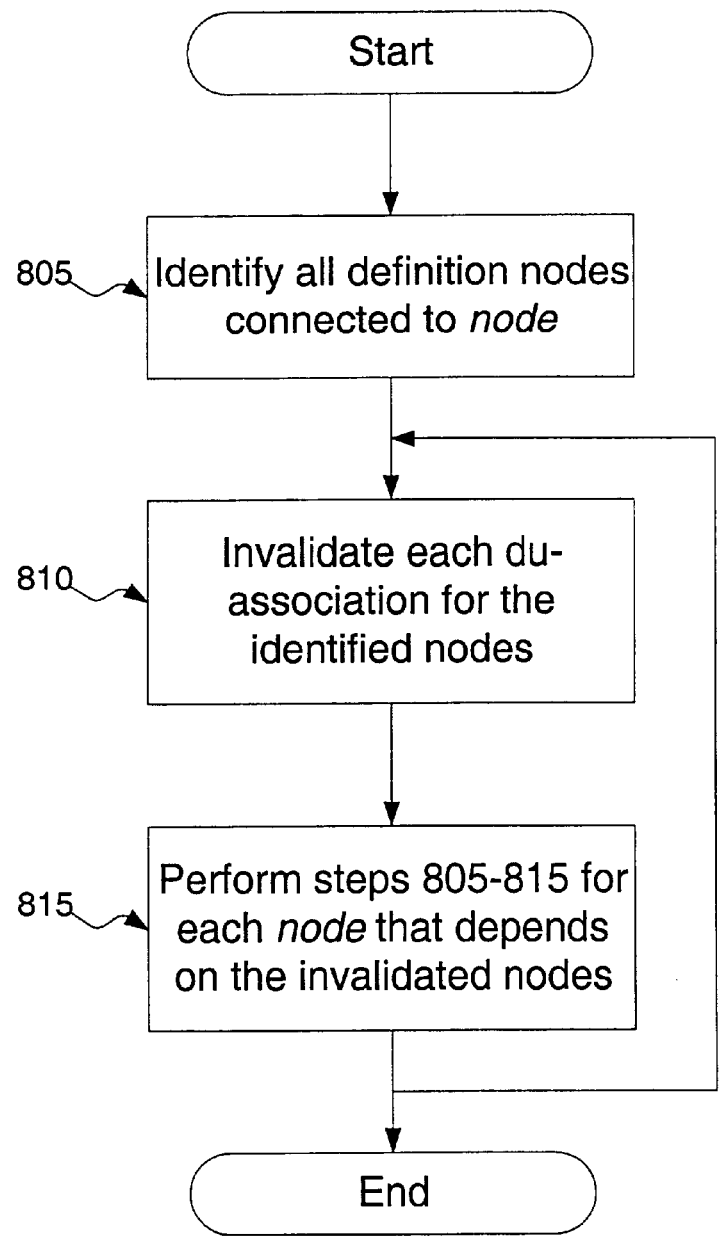
FIG. 8 shows a flowchart of the method for invalidating du-associations using the Region Representative approach.

The algorithm for adjusting testedness (Task 4) is shown in Tables 11–12 and FIG. 8 in terms of CFG nodes. Line 2 of Table 11 simply invokes the algorithm of Table 12 using the entry CFG node of the region representative. Line 2 of Table 12 identifies each definition node connected to node (step 805). Lines 3–4 (step 810) invalidate each du-association for the identified nodes. Finally, line 5 (step 815) recursively invokes CFGNodeInvalidate for each node (in any CFG) that depends on the invalidated node.

TABLE 11

1. algorithm AdjustTestedness(Rij)
2. CFGNodeInvalidate(Rij.EntryNode)

TABLE 12

1. algorithm CFGNodeInvalidate(node)
2. for each definition node defNode in the subtree rooted at node do
3.   for each association dua ∈ defNode.OutgoingDUA do
4.     dua.validated = false
5.     CFGNodeInvalidate(dua.useNode)

D. Cost Savings

As the example involving student grades demonstrates, the Region Representative approach can produce substantial time cost savings. More generally, the number of cells visited provides one measure of time costs. Table 13 gives a comparison of the two approaches on this basis, showing the number of cells visited in reasoning about region R containing n cells. The RR column shows the efficiency advantages of the Region Representative approach by comparing the visits RR adds to and subtracts from SF's visits are highlighted. (For simplicity of this table, an "ordinary" non-region cell is defined to be a representative of itself.) A more extensive analysis of time costs is given in Appendix A.

TABLE 13

| Task | Trigger | Cells Visited: Straight forward Approach (SF) | Cells Visited: Region Representative Approach (RR) |
|---|---|---|---|
| 1: Collect du-associations for region R. | The user changes region R's formula. | SF1 = \|{R's Direct Producers}\| + n | RR1 = SF1 − n + 1 |
| 2: Track execution traces. | One or more cells execute. | SF2 = Number of cells executing. | RR2 = SF2 |
| 3: Validate all of region R. | The user performs one validation. | SF3 = \|{R's Producers}\| + n | RR3 = SF3 − \|{R's Producers}\| + \|{R's Producers' reps}\| |
| 4: Adjust testedness for R. | The user changes region R's formula. | SF4 = \|{R's Consumers}\| + n | RR4 = SF4 − \|{R's Consumers}\| + \|{R's Consumers' reps}\| |

VI. Enhanced User Guidance

U.S. patent application Ser. No. 09/438,084, entitled "METHODOLOGY FOR TESTING SPREADSHEETS", filed Nov. 10, 1999, described the use of validation tabs in validating a cell's formula. To review, when a user is satisfied that a formula is producing the correct result, the user clicks on the validation tab. In the preferred embodiment, this causes cell borders to become more blue, indicating greater testedness of their formulas, and a checkmark is displayed in the validation tab of the validated cell. If the content of any input cell upon which the validated cell's formula depends changes, the checkmark is removed and a question mark is displayed. This informs the user that although a previous value of the formerly-validated cell's formula was validated, the current value has not been validated.

If, however, requiring the user to re-validate the cell's formula will not increase the testedness of any cell's formula, changing a checkmark to a question mark does not provide useful guidance in testing. In such a circumstance, it is preferable to not insert a question mark in the validation tab. The question mark is most useful when it identifies a cell for which re-validation will guarantee progress in testing the spreadsheet.

Figure 10:
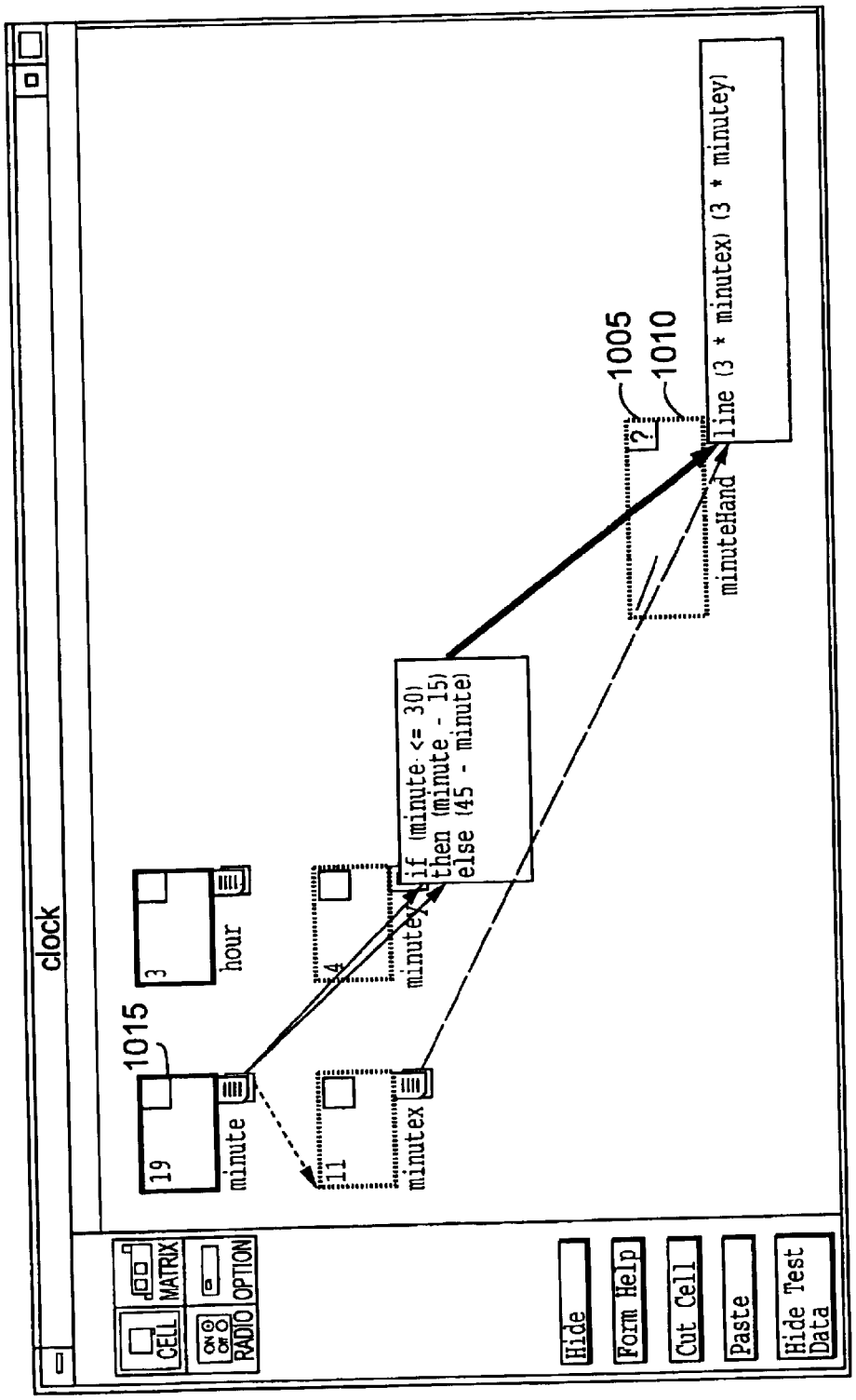
FIG. 10 shows a portion of a clock spreadsheet, including a validation tab with a question mark.

For example, FIG. 10 shows a portion of a clock spreadsheet. Validation tab 1005 of cell minuteHand 1010 shows a question mark. The question mark might have been inserted because of a change in the value of cell minute 1015. But if the change in value of cell minute 1015 was from 22 to 19, requiring the user to re-validate cell 1010 will not increase the testedness of any cell in the spreadsheet. Specifically, cell minuteHand 1010 depends on cells minutex 1020 and minutey 1025. But the execution trace of cells minutex 1020 and minutey 1025 is not affected by the change in value to cell minute 1015: no new du-associations will be covered by re-validating cell minuteHand 1010. So, in this example, changing the value of cell minute 1015 should not have caused a question mark to be inserted in validation tab 1005.

But if the change in value of cell minute 1015 was from 41 to 19, requiring the user to re-validate cell 1010 will increase the testedness of a cell in the spreadsheet. Specifically, the execution trace of cell minutey 1025 will be different as a result of the change in value of cell minute 1015. Re-validating cell minuteHand 1010 will cover new du-associations and cause the border of cell minutey 1025 to become bluer. So, in this example, changing the value of cell minute 1015 should cause a question mark to be inserted in validation tab 1005.

Introducing this added functionality into the spreadsheet requires slightly more computing to determine whether an individual validation tab should display a question mark. But experimental results suggest that user testing of spreadsheets is substantially more efficient using the new question marks.

VII. Conclusion

Two approaches incorporate the homogeneity of spreadsheet grids into the system's reasoning and the user's interactions about testedness, leading to two advantages important to scalability:

First, both the Straightforward and the Region Representative approaches allow a user validation action on one cell to be leveraged across an entire region. This reduces user actions, and also requires less manual test generation in the case of the Region Representative approach. Second, the Region Representative approach reduces the system time required to maintain testedness data, so that it removes the dependency of system time on grid region size. This is key in maintaining the high responsiveness that is expected in spreadsheet languages.

Both approaches to testing are designed for tight integration into the environment, with the only visible additions being checkboxes and coloring devices. There are no testing vocabulary words such as "du-association" displayed, no CRG graphs displayed, no dialog boxes about testing options, and no separate windows of testing results. This design reflects the goal of our research into testing methodologies for this kind of language, which is to bring at least some of the benefits that can come from the application of formal testing methodologies to spreadsheet users.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

Appendix A: Time Complexities of Region Representative Algorithms

This section analyzes the worst-case time complexities of the algorithms. The essence of this section is that the time costs of running these algorithms for all except the validate task are approximately the same as other tasks that are taking place due to the same triggers. This means that all except the validate task add little or no more than $O(1)$ to the time cost of operations in a spreadsheet language that does not have a testing subsystem. (The validate task's time cost is similar to the time cost of calculating the value of the cells in the region being validated.)

A.1 Task 1 (Collect Du-associations for Region R)

A.1.1 Time Complexity

The numbers refer to the line numbers in the CollectAssocRR algorithm. Indentation reflects nesting in the algorithm, which indicates that the indented costs must be multiplied by the outer costs.

1, 2=together these total O(N-uses)
       3, 4, 5, 6-ignored, since lines 7, 8, 9, 10, 11 are more expensive
       7=O(1)
       8=O(N-regions-in-grid-referenced-by-use)
       9=O(N-regions-in-grid-referenced-by-use)
          10=O(N-defs-in-defRij)
          11=O(1)

Total time cost=N-uses*N-regions*N-defs-in-referenced-regions, where N-uses is the number of uses in the CFG for Rij, Rij is the region representative for region R, N-regions is the maximum number of grid regions (statically) referenced by any use in Rij, and N-defs-referenced is the maximum number of definition nodes in any referenced region.

A.1.2 Cost Added by This Task

This algorithm is triggered when the user changes region R's formula. At this point, the tasks any spreadsheet language must perform even without the existence of a testing subsystem are (1) to parse the formula, which costs at least the number of characters in the formula, (2) to calculate at least the on-screen cells in R, and (3) to notify any consumers of the edited cell that their cached values must be discarded.

If there are no references in range format (e.g., "sum (A1:A10)"), then N-uses is proportional to the length of a formula. If there are references in range format, then for strict operators, all of N-uses still must be visited by the evaluation engine to calculate the value of at least one element of R. But for non-strict (lazy) operators, such as "if," the cost of N-uses can exceed the cost of evaluation. It is also worth noting that spreadsheet languages do not provide syntax allowing a single range reference to reference multiple grids, so the number of uses in any one range reference is bounded by the size of the grid. (The number of such range references cannot, of course, exceed the size of the formula.)

N-regions, the number of regions in a grid, reflects the homogeneity of the grid. Since the methodology given here is targeted for grids with a large amount of homogeneity, the number of regions in any grid will always be small compared to the size of the grid. (We will denote this quantity as <<|grid|.)

N-defs-referenced is proportional to the size of a region's formula, which must be traversed by the formula parser.

Hence, the time cost added to a spreadsheet language by Task 1 is $O(1)*O(<<|grid|) *O(1)$ for formulas without range-format referencing, and $O(|grid|)*O(<<|grid|)*O(1)$ for formulas with range-format referencing.

As explained above, when the first factor above is dependent on the size of the grid, it is in many cases less than the number of cells already visited by the evaluations invoked by the same trigger.

A.2 Task 2 (Track Execution Traces)

This task is triggered when one or more cells execute. It is implemented by a probe in the evaluation engine, which adds O(1) to the cost of evaluating a cell.

A.3 Task 3 (Validate all of Region R)

A.3.1 Time Complexity

The numbers refer to the line numbers in the ValidateRR and ValidateAssocRR algorithms.

Cost of ValidateRR:
       1, 2=together these total O(N-DUAs)
          3=cost of ValidateAssocRR
    Cost of ValidateAssocRR:
       1–5: ignored because 6–10 are more expensive and thus determine the worst-case cost.
       6=O(1)
       7=O(1)
       8=O(N-cfg-nodes-in-defcell)
       9=O(1)
       10=cost of ValidateRR The recursive call in line number 10 is tail recursive and is called on a producer of the incoming cell; hence it could be eliminated, instead adding a loop just inside ValidateRR something like "for cell and every producer of cell do . . . "

From this it is clear that the total cost is O(N-producers*N-DUAs*N-CFGNodes), where N-producers is the number of producers of this cell (i.e., the size of the backwards dynamic slice of this cell), N-DUAs is the maximum number of du-associations in the region representatives involved, and N-CFGNodes is the maximum number of CFG nodes in the region representatives involved.

N-DUAs is bounded by the number of definitions, which is bounded by formula size (a constant maximum number of characters). This is also true of N-CFGNodes. Hence the total time cost reduces to O(N-producers*1*1). This is similar to the cost of evaluating a cell when there are no relevant cached values, but unlike the evaluator, it does not need to access any consumers to notify them that their cached values are out of date.

A.3.2 Cost Added by This Task

This task is triggered when the user performs one validation of a cell (variable cell in the algorithm). Unlike the other tasks, no other spreadsheet work needs to be performed given this trigger, so all time costs are due solely to the presence of the testing subsystem.

A.4 Task 4 (Adjust Testedness for Region R)

A.4.1 Time Complexity

The numbers refer to the line numbers in the AdjustTestedness and CFGNodeInvalidate algorithms.

1, 2=O(N-DUA)

3=O(1)

4=cost of CFGNodeInvalidate

The recursive call in line 4 is tail recursive, and is the same as a calling loop over every consumer of Rij. From this it is clear that the total time cost is O(N-consumers * N-DUA).

A.4.2 Cost Added by This Task

This task, like Task 1, is triggered when a new formula is entered for region R. Since the evaluation engine must visit all the consumers of the edited cell for purposes of discarding cached values, and since N-DUA is bounded by the length of the formula that must be parsed, the cost added by this task is O(1) to the other work that must be performed even without any testing subsystem in place.

BIBLIOGRAPHY (Burnett98) M. Burnett and H. Gottfried, "Graphical Definitions: Expanding Spreadsheet Languages through Direct Manipulation and Gestures," *ACM Trans. Computer-Human Interaction* 5(1), 1–33, Mar. 1998.

(Chi98) E. Chi, J. Riedl, P. Barry, and J. Konstan, "Principles for Information Visualization Spreadsheets," *IEEE Completer Graphics and Applications*, July/August 1998.

(Cook99) C. Cook, K. Rothermel, M. Burnett, T. Adams, G. Rothermel, A. Sheretov, F. Cort, J. Reichwein. Does immediate visual feedback about testing aid debugging in spreadsheet language? TR 99-60-07, Oregon State University, March 1999.

(Djang98) R. Djang and M. Burnett, "Similarity Inheritance: A New Model of Inheritance for Spreadsheet VPLs," *1998 IEEE Symp. Visual Languages*, Halifax, Canada, 134–141, Sept. 1–4, 1998.

(Frankl88) P. Frankl and E. Weyuker, "An Applicable Family of Data Flow Criteria," *IEEE Trans. Software Engineering* 14(10), 1483–1498, October 1988.

(Hamlet93) D. Hamlet, B. Gifford, and B. Nikolik, "Exploring Dataflow Testing of Arrays," *Int. Coif. Software Engineering*, 118–129, May 1993.

(Horgan91) J. Horgan and S. London, "Data Flow Coverage and the C Language," *Proc. Fourth Symp. Testing, Analysis, and Verification*, 87–97, October 1991.

(Leopold97) J. Leopold and A. Ambler, "Keyboardless Visual Programming Using Voice, Handwriting, and Gesture," *1997 IEEE Symp. Visual Languages*, Capri, Italy, 28–35, Sep. 23–26, 1997.

(Myers91) B. Myers, "Graphical Techniques in a Spreadsheet for Specifying User Interfaces," *ACM Conf. Human Factors in Computing Systems*, New Orleans, La., 243–249, Apr. 28–May 2, 1991.

(Nardi91) B. Nardi and J. Miller, "Twinkling Lights and Nested Loops: Distributed Problem Solving and Spreadsheet Development," *Int. Journal of Man-Machine Studies* 34, 161–194, 1991.

(Panko96) R. Panko and R. Halverson, "Spreadsheets on Trial: A Survey of Research on Spreadsheet Risks," *Hawaii Int. Conf System Sciences*, Maui, Hi., Jan. 2–5, 1996.

(Rothermel98)G. Rothermel, L. Li, C. DuPuis, and M. Burnett, "What You See Is What You Test: A Methodology for Testing Form-Based Visual Programs," *Int. Conf. Software Engineering*, 198–207, April 1998.

(Smedley96) T. Smedley, P. Cox, and S. Byrne, "Expanding the Utility of Spreadsheets Through the Integration of Visual Programming and User Interface Objects," *ACM Proc. Workshop on Advanced Visual Interfaces*, Gubbio, Italy, 148–155, May 27–29, 1996.

(Wang96) G. Wang and A. Ambler, "Solving Display-Based Problems," *1996 IEEE Symp. Visual Languages*, Boulder, Colo., 122–129, Sep. 3–6, 1996.

(Weyuker90) E. Weyuker, "The Cost of Data Flow Testing: An Empirical Study," *IEEE Trans. Software Engineering* 16(2), February 1990.

(Wilcox97) E. Wilcox, J. Atwood, M. Burnett, J. Cadiz, and C. Cook, "Does Continuous Visual Feedback Aid Debugging in Direct-Manipulation Programming Systems?" *ACM Conf Human Factors in Computing Systems*, 258–265, Mar. 22–27, 1997.

(Wilde90) N. Wilde and C. Lewis, "Spreadsheet-Based Interactive Graphics: From Prototype to Tool," *ACM Conf Human Factors in Computing Systems*, 153–159, April 1990.

We claim:

1. A method for testing a grid of spreadsheet cells in a computerized spreadsheet containing a plurality of spreadsheet cells and a first and at least second grid, wherein each grid includes one or more spreadsheet cells and one or more formulas, the method comprising:

selecting the first grid of spreadsheet cells;

collecting one or more test elements for the first grid;

tracking an execution trace for each spreadsheet cell in the first grid; and marking as covered a subset of the test elements that participated in the execution trace for at least one spreadsheet cell in the first grid.

2. A method according to claim 1 further comprising:

identifying all other spreadsheet cells upon which each cell in the first grid depends; and for each other spreadsheet cell, repeating the steps of collecting, tracking, and marking.

3. A method according to claim 1 wherein marking as covered a subset of the test elements includes receiving a user validation of the at least one spreadsheet cell in the first grid.

4. A method according to claim 3 further comprising:

identifying all other spreadsheet cells upon which the at least one spreadsheet cell in the first grid depends; and for each second grid containing another spreadsheet cell, repeating the steps of collecting, tracking, and marking so that any test elements for the second grid are marked as covered independently of whether each other spreadsheet cell has been user-validated.

5. A method according to claim 3 wherein receiving a user validation includes having a user click on a validation tab for the at least one spreadsheet cell in the first grid.

6. A method according to claim 3 wherein receiving a user validation includes displaying a validation symbol for the at least one spreadsheet cell in the first grid.

7. A method according to claim 1 further comprising:
discarding the test elements for a subset of spreadsheet cells of the first grid after a user changes a formula for the first grid; and
repeating the steps of collecting, tracking, and marking for the subset of spreadsheet cells of first grid.

8. A method according to claim 7 wherein discarding the test elements for a subset of spreadsheet cells of the first grid includes:
identifying all other spreadsheet cells that reference a spreadsheet cell in the subset of spreadsheet cells of the first grid; and
marking as uncovered all test elements for the identified spreadsheet cells that reference a spreadsheet cell in the subset of spreadsheet cells of the first grid.

9. A method according to claim 8 wherein marking as uncovered all test elements for the identified spreadsheet cells includes invalidating a user validation for the identified spreadsheet cells.

10. A method according to claim 9 wherein invalidating a user validation includes changing a validation symbol representing a validated spreadsheet cell for the identified spreadsheet cells to a validation symbol representing uncertainty about the identified spreadsheet cells' validation.

11. A method according to claim 9 wherein invalidating a user validation includes removing a validation symbol representing a validated spreadsheet cell for the identified spreadsheet cells.

12. A method according to claim 7 wherein discarding the test elements for the subset of spreadsheet cells of the first grid includes invalidating a user validation for each spreadsheet cell in the subset of spreadsheet cells of the first grid.

13. A method according to claim 12 wherein invalidating a user validation includes changing a validation symbol representing a validated spreadsheet cell in the first grid to a validation symbol representing uncertainty about the spreadsheet cell's validation.

14. A method according to claim 12 wherein invalidating a user validation includes removing a validation symbol representing a validated spreadsheet cell in the first grid.

15. A method according to claim 1 further comprising providing the user with a visible indication of whether each spreadsheet cell in the first grid has been completely tested.

16. A method according to claim 1 further comprising providing the user with a visible indication of how completely each spreadsheet cell in the first grid has been tested.

17. A method according to claim 1 wherein the test elements are chosen from the group consisting of du-associations, node identifications, edge identifications, and cell identifications.

18. A method according to claim 1 wherein the first grid includes a first region, the first region including a region representative and the region representative including a formula shared among all spreadsheet cells in the first region.

19. A method according to claim 18 wherein collecting one or more test elements includes collecting one or more du-associations for the region representative.

20. A method according to claim 19 wherein one or more du-associations are collected as the shared formula is entered for the first region.

21. A method according to claim 18 wherein collecting one or more test elements includes:
identifying all other region representatives used in the shared formula for the region representative;
identifying all definitions of the other region representatives that are used in the shared formula for the region representative; and
creating a du-association between each definition of the region representatives and each use of the definition in the shared formula for the region representative.

22. A method according to claim 18 wherein collecting one or more test elements includes identifying the other spreadsheet cells referenced by the at least one spreadsheet cell.

23. A method according to claim 18 wherein marking as covered a subset of the test elements includes:
receiving a user validation of the at least one spreadsheet cell in the first region; and
after receiving the user validation of the at least one spreadsheet cell in the first region, marking as covered the subset of the test elements for the region representative that participated in the execution trace for the at least one spreadsheet cell in the first region.

24. A method according to claim 18 wherein marking as covered a subset of the test elements includes marking as covered du-associations for the region representative that were participated in the execution trace of the at least one spreadsheet cell in the first region, where each du-association includes a definition of a second region representative and a use of the definition of the second region representative in the shared formula for the region representative.

25. A method according to claim 18 wherein marking as covered du-associations includes marking as covered each du-association that includes a use that is part of the shared formula for the region representative and participated in the execution trace for the at least one spreadsheet cell.

26. A method according to claim 18 further comprising:
discarding the test elements for the region representative after a user changes the shared formula for the region representative; and
repeating the steps of collecting, tracking, and marking for the region representative.

27. A method according to claim 26 wherein discarding the test elements for the region representative includes:
identifying all other spreadsheet cells in the spreadsheet that depend on the region representative; and
marking as uncovered all test elements for the identified spreadsheet cells that use a definition of the region representative.

28. A method according to claim 18 further comprising marking as uncovered a subset of the test elements for the region representative affected by a change in the shared formula for the region representative.

29. A method according to claim 18 wherein marking as covered a subset of the test elements includes statically resolving a reference in the shared formula for the region representative to a second spreadsheet cell for the at least one spreadsheet cell.

30. A method according to claim 1 wherein each spreadsheet cell in the first grid includes a formula.

31. A method according to claim 16, wherein:
the first grid includes a first region, the first region including a region representative and the region representative including a formula shared among all spreadsheet cells in the first region; and providing the user with a visible indication of how completely each spreadsheet cell in the first grid has been tested includes:
  identifying a subset of the set of test elements that have been covered;
  using the set of test elements and the subset of the set, calculating a testedness measure of test elements that have been covered; and
  providing the user with an indication of the testedness measure of the region representative at each spreadsheet cell in the region.

32. A method according to claim 31, wherein providing the user with an indication of the testedness measure includes coloring the border of each spreadsheet cell in the region, where the color chosen indicates the testedness measure.

33. A method according to claim 32 wherein the color chosen to indicate the testedness measure varies between red and blue, the color red representing a 0% testedness percentage and the color blue representing a 100% testedness percentage.

34. A method according to claim 31 further including updating the indication of the testedness measure as the testedness measure changes.

35. A computer-readable medium containing a testing program to testing, in a computerized spreadsheet, a region of spreadsheet cells, the testing program comprising:
  a test element data structure for storing a set of one or more test elements for the region;
  a trace data structure for storing an execution trace for each spreadsheet cell in the region; and
  a subroutine operable to mark as covered any test elements for the region that participated in the execution trace for at least one spreadsheet cell.

36. A system for testing a grid of spreadsheet cells in a spreadsheet on a computer system, the system comprising:
  a set of one or more test elements for the grid;
  an execution trace for each spreadsheet cell in the grid; and
  a marking unit to mark as covered those test elements for the grid that participated in the execution trace for at least one spreadsheet cell in the grid.

37. In a computerized spreadsheet containing a plurality of spreadsheet cells, a method for testing a first spreadsheet cell containing a formula, the method comprising:
  collecting one or more test elements;
  tracking an execution trace of the first spreadsheet cell;
  marking as covered a subset of the test elements that participated in the execution trace for the first spreadsheet cell;
  discarding the test elements for the first spreadsheet cell after a user changes the formula for the first spreadsheet cell;
  repeating the steps of collecting, tracking, and marking for the first spreadsheet cell;
  identifying all other spreadsheet cells that depend on the first spreadsheet cell;
  marking as uncovered all test elements for the identified cells that use a definition of the first spreadsheet cell;
  invalidating a user validation for the identified cells; and
  removing a validation symbol representing a validated spreadsheet cell from the identified cells.

38. A method according to claim 37 wherein removing a validation symbol includes inserting a validation symbol representing uncertainty for the identified cells when requiring re-validation of the identified cells will mark as covered a test element not marked as covered for the identified cells.

39. A method according to claim 38 wherein:
  the validation symbol representing a validated spreadsheet cell is a checkmark; and
  the validation symbol representing uncertainty is a question mark.

40. A method according to claim 37 wherein:
  the first spreadsheet cell is in a region of the spreadsheet containing a group of cells comprising the first spreadsheet cell and at least at least a second spreadsheet cell;
  collecting one or more test elements includes collecting one or more test elements for the region;
  discarding the test elements for the first spreadsheet cell includes discarding the test elements for the region after a user changes a shared formula for the region;
  repeating the steps of collecting, tracking, and marking includes repeating the steps of collecting, tracking, and marking for the region;
  identifying all other spreadsheet cells includes identifying all other spreadsheet cells that reference any spreadsheet cell in the first region; and
  marking as uncovered all test elements for the identified cells includes marking as uncovered all test elements for the identified cells that use a definition of the shared formula for the region.

* * * * *

UNITED STATES PATENT AND TRADEMARK OFFICE
CERTIFICATE OF CORRECTION

PATENT NO.   : 6,766,509 B1
DATED        : July 20, 2004
INVENTOR(S)  : Sheretov et al.

It is certified that error appears in the above-identified patent and that said Letters Patent is hereby corrected as shown below:

Title page,
Item [56], References Cited, OTHER PUBLICATIONS,
"T. Bell", reference, "S. Eick, "Visualization Program" should read -- S. Eick, "Visualizing Program --.

Column 1,
Line 53, "(Rothernel98) presents" should read -- (Rothermel98) presents --.

Column 2,
Line 29, "for a using" should read -- for a cell using --.

Column 6,
Line 21, "and 2451, within" should read -- and 245I, within --.
Line 67, "validate arty arbitrary" should read -- validate any arbitrary --.

Column 7,
Line 14, "the user-clicked the" should read -- the user clicked the --.

Column 8,
Line 4, "referencing-common in" should read -- referencing common in --.

Column 10,
Line 23, "Rij. Uses," should read -- Rij.Uses, --.

Column 11,
Line 3, "line corresponds to" should read -- line 5 corresponds to --.
Line 53, "of the rid. This" should read -- of the grid. This --.

Column 12,
Line 2, "the ValidatectID field," should read -- the ValidatedlD field, --.
Line 45, "FIG. 7C shout the" should read -- FIG. 7C show the --.
Line 62, "to line 1, line" should read -- to line 1, line --.

Column 13,
Line 3, "algorithm. ValidateRR(C)" should read -- algorithm ValidateRR(C) --.
Line 16, "defcell = StaticallyResolve" should read -- defCell = StaticallyResolve --.

UNITED STATES PATENT AND TRADEMARK OFFICE
CERTIFICATE OF CORRECTION

PATENT NO. : 6,766,509 B1
DATED : July 20, 2004
INVENTOR(S) : Sheretov et al.

It is certified that error appears in the above-identified patent and that said Letters Patent is hereby corrected as shown below:

Column 17,
Line 48, "IEEE Completer Graphics" should read -- IEEE Computer Graphics --.
Line 63, "Int. Coif. Software" should read -- Int. Conf. Software --.

Column 21,
Line 15, "claim 31, wherein" should read -- claim 31 wherein --.

Signed and Sealed this

Twenty-eighth Day of June, 2005

JON W. DUDAS
*Director of the United States Patent and Trademark Office*